United States Patent
Haque et al.

(10) Patent No.: US 10,327,005 B2
(45) Date of Patent: Jun. 18, 2019

(54) VIDEO CODING SYSTEM WITH TEMPORAL LAYERS AND METHOD OF OPERATION THEREOF

(71) Applicant: SONY CORPORATION, Tokyo (JP)

(72) Inventors: Munsi Haque, San Jose, CA (US); Kazushi Sato, Kanagawa (JP); Ali Tabatabai, Cupertino, CA (US); Teruhiko Suzuki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/803,940

(22) Filed: Nov. 6, 2017

(65) Prior Publication Data

US 2018/0063542 A1    Mar. 1, 2018

Related U.S. Application Data

(63) Continuation of application No. 13/757,624, filed on Feb. 1, 2013, now Pat. No. 9,912,941.

(60) Provisional application No. 61/677,302, filed on Jul. 30, 2012, provisional application No. 61/667,269, filed on Jul. 2, 2012.

(51) Int. Cl.
*H04N 19/44* (2014.01)
*H04N 19/70* (2014.01)
*H04N 19/30* (2014.01)

(52) U.S. Cl.
CPC ........... *H04N 19/44* (2014.11); *H04N 19/45* (2014.11); *H04N 19/70* (2014.11); *H04N 19/30* (2014.11)

(58) Field of Classification Search
CPC .............................. H04N 19/45; H04N 19/44
See application file for complete search history.

(56) References Cited

U.S. PATENT DOCUMENTS

| | | |
|---|---|---|
| 2004/0190606 A1 | 9/2004 | Deshpande |
| 2006/0120463 A1 | 6/2006 | Wang |
| 2009/0066858 A1 | 3/2009 | Turner et al. |
| 2010/0086034 A1 | 4/2010 | Park et al. |
| 2010/0091837 A1 | 4/2010 | Zhu et al. |

(Continued)

FOREIGN PATENT DOCUMENTS

| | | |
|---|---|---|
| CN | 101578867 A | 11/2009 |
| JP | 2009-506626 A | 2/2009 |

(Continued)

OTHER PUBLICATIONS

Bross, et al., "High-Efficiency Video Coding (HEVC) text specification draft 8", Joint Collaborative Team on Video Coding (JCT-VC) of ITU-T SG16 WP3 and ISO/IEC JTC1/SC29/WG11, Stockholm, Sweden, Jul. 11-20, 2012, pp. 1-260.

(Continued)

*Primary Examiner* — William C Vaughn, Jr.
*Assistant Examiner* — Jerry T Jean Baptiste
(74) *Attorney, Agent, or Firm* — Chip Law Group

(57) ABSTRACT

An encoding apparatus of a video coding system includes a setting unit and an encoder which is connected to the setting unit. The setting unit sets video usability information (VUI) parameter including field_seq_flag. The field_seq_flag indicates whether a video stream includes a video representing field and common to all occurrences of a temporal layer. The encoder encodes the video stream based on the temporal layer to generate an encoding bitstream including the VUI set by the setting unit.

12 Claims, 10 Drawing Sheets

(56) References Cited

U.S. PATENT DOCUMENTS

| | | |
|---|---|---|
| 2010/0091841 A1 | 4/2010 | Ishtiaq et al. |
| 2010/0098154 A1 | 4/2010 | Lou et al. |
| 2010/0142613 A1 | 6/2010 | Zhu |
| 2010/0195738 A1 | 8/2010 | Zhu et al. |
| 2010/0232520 A1 | 9/2010 | Wu et al. |
| 2011/0043701 A1 | 2/2011 | Kurita et al. |
| 2011/0058613 A1 | 3/2011 | Han et al. |
| 2011/0280316 A1 | 11/2011 | Chen et al. |
| 2012/0133736 A1 | 5/2012 | Nishi et al. |
| 2012/0183076 A1 | 7/2012 | Boyce et al. |
| 2012/0183077 A1 | 7/2012 | Hong et al. |
| 2012/0229602 A1 | 9/2012 | Chen et al. |
| 2012/0230397 A1 | 9/2012 | Ouedraogo et al. |
| 2012/0230431 A1 | 9/2012 | Boyce et al. |
| 2013/0191550 A1 | 7/2013 | Hannuksela |
| 2013/0266076 A1* | 10/2013 | Wang .................. H04N 19/70 375/240.25 |
| 2013/0343465 A1* | 12/2013 | Chen .................. H04N 19/597 375/240.24 |
| 2014/0016697 A1 | 1/2014 | Wang |
| 2014/0022343 A1 | 1/2014 | Chen |
| 2014/0098896 A1 | 4/2014 | Wang |
| 2015/0055712 A1* | 2/2015 | Hannuksela ... H04N 21/234327 375/240.16 |

FOREIGN PATENT DOCUMENTS

| | | |
|---|---|---|
| JP | 2010-516085 A | 5/2010 |
| JP | 2010-524394 A | 7/2010 |
| JP | 2010-531554 A | 9/2010 |
| KR | 10-2009-0106502 A | 10/2009 |
| KR | 10-2010-0061715 A | 6/2010 |
| WO | 2008/085433 A2 | 7/2008 |
| WO | 2008/128388 A1 | 10/2008 |
| WO | 2008/130500 A2 | 10/2008 |
| WO | 2011/102598 A1 | 8/2011 |
| WO | 2012/010928 A1 | 1/2012 |

OTHER PUBLICATIONS

Bross, et al., "High-Efficiency Video Coding (HEVC) text specification draft 7", Joint Collaborative Team on Video Coding (JCT-VC) of ITU-T SG16 WP3 and ISO/IEC JTC1/SC29/WG11, JCTVC-11003_d4, Geneva, CH, Apr. 2012.

Haque, et al., "HEVC VUI Parameters with Extension Hooks", Joint Collaborative Team on Video Coding (JCT-VC) of ITU-T SG16 WP3 and ISO/IEC JTC1/SC29/WG11, JCTVC-11003_d4, Stockholm, Sweden, Jul. 11-20, 2012, pp. 1-7.

Haque, et al., "Extension of HEVC VUI Syntax Structure", Joint Collaborative Team on Video Coding (JCT-VC) of ITU-T SG16 WP3 and ISO/IEC JTC1/SC29/WG11, JCTVC-11003_d4, Geneva, CH, JCTVC-10263, Apr. 2012, pp. 1-5.

Haque, et al., "AHG10: VUI and HRD syntax designs agreed by the BoG on VPS and NUH", Joint Collaborative Team on Video Coding (JCT-VC) of ITU-T SG16 WP3 and ISO/IEC JTC1/SC29/WG11, JCTVC-J0548rl, Geneva, CH, JCTVC-10263, Jul. 2012, pp. 1-7.

Sullivan, et al., "Overview of the High Efficiency Video Coding (HEVC3) Standard", IEEE Transactions on Circuit and Systems for Video Technology, Dec. 2012, pp. 1-19.

International Search Report and Written Opinion of PCT Application No. PCT/US2013/048890, dated Sep. 6, 2013, 08 pages of ISRWO.

International Search Report and Written Opinion of PCT Application No. PCT/US2013/048902, dated Sep. 4, 2013, 06 pages of ISRWO.

International Search Report and Written Opinion of PCT Application No. PCT/US2013/048925, dated Sep. 13, 2013, 07 pages of ISRWO.

Extended European Search Report of EP Application No. 13812715.4, dated Feb. 8, 2016, 10 pages of EESR.

Office Action for JP Patent Application No. 2015-520616, dated Feb. 3, 2016, 9 pages of Office Action and 6 pages of English Translation.

Manu Mathew, "Overview of Temporal Scalability With Scalable Video Coding (SVC)", Texas Instruments, Application Report, Nov. 2010, 8 pages.

Sanjay Acharya, "Ultra High Definition Television: Threshold of a new age", ITU Committed to connecting the world, Press Release, May 24, 2012, 1 page.

Office Action for KR Patent Application No. 10-2014-7036701, dated Mar. 9, 2016, 8 pages of Office Action and 4 pages of English Translation.

Office Action for KR Patent Application No. 10-2016-7035740, dated Jan. 16, 2017, 4 pages of Office Action and 3 pages of English Translation.

Office Action for JP Patent Application No. 2016-097817, dated Feb. 7, 2017, 4 pages.

Office Action for CN Patent Application No. 201380034953.3, dated Mar. 2, 2017, 11 pages of Office Action and 23 pages of English Translation.

Office Action for KR Patent Application No. 10-2017-7017928, dated Aug. 10, 2017, 5 pages of Office Action and 4 pages of English Translation.

Office Action for KR Patent Application No. 10-2017-7017927, dated Aug. 8, 2017, 5 pages of Office Action and 4 pages of English Translation.

Non Final Office Action for U.S. Appl. No. 13/757,624, dated Apr. 6, 2015, 15 pages.

Non Final Office Action for U.S. Appl. No. 13/757,624, dated Jun. 15, 2016, 10 pages.

Final Office Action for U.S. Appl. No. 13/757,624, dated Oct. 23, 2015, 10 pages.

Final Office Action for U.S. Appl. No. 13/757,624, dated Dec. 1, 2016, 11 pages.

Notice of Allowance for U.S. Appl. No. 13/757,624, dated Aug. 11, 2017, 11 pages.

Office Action for JP Patent Application No. 2017-073380, dated Dec. 26, 2017, 04 pages of Office Action and 04 pages of English Translation.

Office Action for JP Patent Application No. 2017-073381, dated Dec. 26, 2017, 04 pages of Office Action and 04 pages of English Translation.

"Series H: Audiovisual and Multimedia Systems", Infrastructure of Audiovisual Services—Coding of Moving Video, Advanced Video Coding for Generic Audiovisual Services, ITU-T, H.264, Telecommunication Standardization Sector of ITU, Jan. 2012, 05 pages.

Haque, et al., "Extension of HEVC VUI Syntax Structure", Joint Collaborative Team on Video Coding (JCT-VC) of ITU-T SG 16 WP 3 and ISO/IEC JTC 1/SC 29/WG 11, Document: JCTVC-I0263, 9th Meeting: Geneva, CH, Apr. 27-May 7, 2012, WG11 No. m24510, 6 pages.

Haque, et al., "HEVC VUI Parameters With Extension Hooks", Joint Collaborative Team on Video Coding (JCT-VC) of ITU-T SG 16 WP 3 and ISO/IEC JTC 1/SC 29/WG 11, Document: JCTVC-J0270, 10th Meeting: Stockholm, Sweden, Jul. 11-20, 2012, WG 11 No. m25598, 8 pages.

Haque, et al., "AHG10: VUI and HRD Syntax Designs Agreed by the Bog on VPS and NUH", Joint Collaborative Team on Video Coding (JCT-VC) of ITU-T SG 16 WP 3 and ISO/IEC JTC 1/SC 29/WG 11 of ITU-T SG 16 WP 3 and ISO/IEC JTC 1/SC 29/WG 11, Document: JCTVC-J0548rl, 10th Meeting: Stockholm, SE, Jul. 11-20, 2012, 7 pages.

Office Action for JP Patent Application No. 2017-073380, dated Jun. 26, 2018, 02 pages of Office Action and 01 pages of English Translation.

Office Action for JP Patent Application No. 2017-073381, dated Jun. 26, 2018, 02 pages of Office Action and 01 pages of English Translation.

"Advanced Video Coding for Generic Audiovisual Services", Series H: Audiovisual and Multimedia Systems, Infrastructure of Audio Services—Coding of Moving Video, Recommendation ITU-T H.264, Jan. 2012, 05 pages.

* cited by examiner

| | | Desc. |
|---|---|---|
| 303 → | vui_parameters( ) { | |
| 304 → |   aspect_ratio_info_present_flag | u(1) |
| |   if( aspect_ratio_info_present_flag ) { | |
| 306 → |     aspect_ratio_idc | u(8) |
| |     if( aspect_ratio_idc == Extended_SAR ) { | |
| 308 → |       sar_width | u(16) |
| 310 → |       sar_height } } | u(16) |
| 312 → |   overscan_info_present_flag | u(1) |
| |   if( overscan_info_present_flag ) | |
| 314 → |     overscan_appropriate_flag | u(1) |
| 316 → |   video_signal_type_present_flag | u(1) |
| |   if( video_signal_type_present_flag ) { | |
| 317 → |     video_format | u(3) |
| 318 → |     video_full_range_flag | u(1) |
| 320 → |     colour_description_present_flag | u(1) |
| |     if( colour_description_present_flag ) { | |
| 322 → |       colour_primaries | u(8) |
| 324 → |       transfer_characteristics | u(8) |
| 326 → |       matrix_coefficients } } | u(8) |
| 328 → |   chroma_loc_info_present_flag | u(1) |
| |   if( chroma_loc_info_present_flag ) { | |
| 330 → |     chroma_sample_loc_type_top_field | ue(v) |
| 332 → |     chroma_sample_loc_type_bottom_field } | ue(v) |
| 334 → |   neutral_chroma_indication_flag | u(1) |
| 336 → |   field_seq_flag | u(1) |
| 338 → |   timing_info_present_flag | u(1) |
| |   if( timing_info_present_flag ) { | |
| 340 → |     num_units_in_tick | u(32) |
| 344 → |     time_scale | u(32) |
| 346 → |     fixed_pic_rate_flag } | u(1) |
| 348 → |   nal_hrd_parameters_present_flag | u(1) |
| |   if( nal_hrd_parameters_present_flag ) | |
| 350 → |     hrd_parameters( ) | |
| 352 → |   vcl_hrd_parameters_present_flag | u(1) |
| |   if( vcl_hrd_parameters_present_flag ) | |
| |     hrd_parameters( ) | |
| |   if( nal_hrd_parameters_present_flag \|\| vcl_hrd_parameters_present_flag) { | |
| 354 → |     low_delay_hrd_flag | u(1) |
| 356 → |     sub_pic_cpb_params_present_flag | u(1) |
| |     if( sub_pic_cpb_params_present_flag ) | |
| 358 → |       num_units_in_sub_tick } | u(32) |
| 360 → |   bitstream_restriction_flag | u(1) |
| |   if( bitstream_restriction_flag ) { | |
| 362 → |     tiles_fixed_structure_flag | u(1) |
| 364 → |     motion_vectors_over_pic_boundaries_flag | u(1) |
| 366 → |     max_bytes_per_pic_denom | ue(v) |
| 368 → |     max_bits_per_mincu_denom | ue(v) |
| 370 → |     log2_max_mv_length_horizontal | ue(v) |
| 372 → |     log2_max_mv_length_vertical } } | ue(v) |

FIG. 3

| | | Desc. |
|---|---|---|
| 404 → | vui_parameters( ) { | |
| | ... | ... |
| 406 → | vui_max_temporal_layers_minus1 | u(3) |
| | for (i=0; i<=vui_max_temporal_layers_minus1; i++ ) { | |
| 336 → |   field_seq_flag[i] | u(1) |
| 338 → |   timing_info_present_flag[i] | u(1) |
| |   if( timing_info_present_flag[i] ) { | |
| 340 → |     num_units_in_tick[i] | u(32) |
| 344 → |     time_scale[i] | u(32) |
| 346 → |     fixed_pic_rate_flag[i] | u(1) |
| |   } | |
| 348 → |   nal_hrd_parameters_present_flag[i] | u(1) |
| |   if( nal_hrd_parameters_present_flag[i] ) | |
| 350 → |     hrd_parameters( ) | |
| 352 → |   vcl_hrd_parameters_present_flag[i] | u(1) |
| |   if( vcl_hrd_parameters_present_flag[i] ) | |
| |     hrd_parameters( ) | |
| |   if( nal_hrd_parameters_present_flag[i] \|\| vcl_hrd_parameters_present_flag[i] ) { | |
| 354 → |     low_delay_hrd_flag[i] | u(1) |
| 356 → |     sub_pic_cpb_params_present_flag[i] | u(1) |
| |     if( sub_pic_cpb_params_present_flag[i] ) | |
| 358 → |       num_units_in_sub_tick[i] | u(32) |
| |   } | |
| | } // | |
| | bitstream_restriction_flag | u(1) |
| | if( bitstream_restriction_flag ) { | |
| |   tiles_fixed_structure_flag | u(1) |
| |   motion_vectors_over_pic_boundaries_flag | u(1) |
| |   max_bytes_per_pic_denom | ue(v) |
| |   max_bits_per_mincu_denom | ue(v) |
| |   log2_max_mv_length_horizontal | ue(v) |
| |   log2_max_mv_length_vertical | ue(v) |
| | } | |
| 408 → | vui_extension_flag | u(1) |
| | if( vui_extension_flag ) { | |
| 410 → |   while( more_rbsp_data() ) | |
| 412 → |     vui_extension_data_flag | u(1) |
| | } | |
| 414 → | rbsp_trailing_bits() | |
| | } | |

| | | |
|---|---|---|
| 502 → | | |
| 504 → | vui_parameters( ) { | Desc. |
| | ... | ... |
| 336 → |   field_seq_flag | u(1) |
| 338 → |   timing_info_present_flag | u(1) |
| |   if( timing_info_present_flag ) { | |
| 340 → |     num_units_in_tick | u(32) |
| 344 → |     time_scale | u(32) |
| 346 → |     fixed_pic_rate_flag | u(1) |
| |   } | |
| 406 → |   vui_max_temporal_layers_minus1 | u(3) |
| |   for (i=0; i<=vui_max_temporal_layers_minus1; i++ ) { | |
| 348 → |     nal_hrd_parameters_present_flag[i] | u(1) |
| |     if( nal_hrd_parameters_present_flag[i] ) | |
| 350 → |       hrd_parameters( ) | |
| 352 → |     vcl_hrd_parameters_present_flag[i] | u(1) |
| |     if( vcl_hrd_parameters_present_flag[i] ) | |
| |       hrd_parameters( ) | |
| |     if( nal_hrd_parameters_present_flag[i] \|\| vcl_hrd_parameters_present_flag[i] ) { // | |
| 354 → |       low_delay_hrd_flag[i] | u(1) |
| 356 → |       sub_pic_cpb_params_present_flag[i] | u(1) |
| |       if( sub_pic_cpb_params_present_flag[i] ) | |
| 358 → |         num_units_in_sub_tick[i] | u(32) |
| |     } | |
| |   } | |
| |   bitstream_restriction_flag | u(1) |
| |   if( bitstream_restriction_flag ) { | |
| |     tiles_fixed_structure_flag | u(1) |
| |     motion_vectors_over_pic_boundaries_flag | u(1) |
| |     max_bytes_per_pic_denom | ue(v) |
| |     max_bits_per_mincu_denom | ue(v) |
| |     log2_max_mv_length_horizontal | ue(v) |
| |     log2_max_mv_length_vertical | ue(v) |
| |   } | |
| 408 → |   vui_extension_flag | u(1) |
| |   if( vui_extension_flag ) { | |
| 410 → |     while( more_rbsp_data() ) | |
| 412 → |       vui_extension_data_flag | u(1) |
| |   } | |
| 414 → |   rbsp_trailing_bits() | |
| | } | |

FIG. 5

| 602 ↘ | | |
|---|---|---|
| 604 → | hrd_parameters( commonInfPresentFlag, MaxNumSubLayersMinus1 ) { | Desc. |
| 603 → |   if( commonInfPresentFlag ) { | |
| 338 → |     timing_info_present_flag | u(1) |
| |     if( timing_info_present_flag ) { | |
| 340 → |       num_units_in_tick | u(32) |
| 344 → |       time_scale | u(32) |
| |     } | |
| 348 → |     nal_hrd_parameters_present_flag | u(1) |
| 352 → |     vcl_hrd_parameters_present_flag | u(1) |
| |     if( nal_hrd_parameters_present_flag \|\| vcl_hrd_parameters_present_flag ){ | |
| 356 → |       sub_pic_cpb_params_present_flag | u(1) |
| |       if( sub_pic_cpb_params_present_flag ) | |
| 610 → |         tick_divisor_minus2 | u(8) |
| 612 → |       bit_rate_scale | u(4) |
| 614 → |       cpb_size_scale | u(4) |
| 616 → |       initial_cpb_removal_delay_length_minus1 | u(5) |
| 618 → |       cpb_removal_delay_length_minus1 | u(5) |
| 620 → |       dpb_output_delay_length_minus1 | u(5) |
| |     } | |
| |   } | |
| 630 → |   for( i = 0; i <= MaxNumSubLayersMinus1; i++ ) { | |
| 346 → |     fixed_pic_rate_flag[ i ] | u(1) |
| |     if( fixed_pic_rate_flag[ i ] ) | |
| 622 → |       pic_duration_in_tc_minus1[ i ] | ue(v) |
| 354 → |     low_delay_hrd_flag[ i ] | u(1) |
| 626 → |     cpb_cnt_minus1[ i ] | ue(v) |
| |     if( nal_hrd_parameters_present_flag ) | |
| 628 → |       hrd_parameters_sub_layer( i ) | |
| |     if( vcl_hrd_parameters_present_flag ) | |
| |       hrd_parameters_sub_layer( i ) | |
| |   } | |
| | } | |

FIG. 6

| 702 ↘ | | |
|---|---|---|
| 704 → | hrd_parameters_sub_layer( tid ) { | Desc. |
| |   for( SchedSelIdx = 0; SchedSelIdx <= cpb_cnt_minus1[ i ]; SchedSelIdx++ ) { | |
| 706 → |     bit_rate_value_minus1[ SchedSelIdx ] | ue(v) |
| 708 → |     cpb_size_value_minus1[ SchedSelIdx ] | ue(v) |
| 710 → |     cbr_flag[ SchedSelIdx ] | u(1) |
| |   } | |
| | } | |

| 804 → | vui_parameters( ) { | Desc. |
|---|---|---|
| | aspect_ratio_info_present_flag | u(1) |
| | if( aspect_ratio_info_present_flag ) { | |
| |   aspect_ratio_idc | u(8) |
| |   if( aspect_ratio_idc = = Extended_SAR ) { | |
| |     sar_width | u(16) |
| |     sar_height } } | u(16) |
| | overscan_info_present_flag | u(1) |
| | if( overscan_info_present_flag ) | |
| |   overscan_appropriate_flag | u(1) |
| 316 → | video_signal_type_present_flag | u(1) |
| | if( video_signal_type_present_flag ) { | |
| 317 → |   video_format | u(3) |
| 318 → |   video_full_range_flag | u(1) |
| 320 → |   colour_description_present_flag | u(1) |
| |   if( colour_description_present_flag ) { | |
| 322 → |     colour_primaries | u(8) |
| 324 → |     transfer_characteristics | u(8) |
| 326 → |     matrix_coefficients } } | u(8) |
| | chroma_loc_info_present_flag | u(1) |
| | if( chroma_loc_info_present_flag ) { | |
| |   chroma_sample_loc_type_top_field | ue(v) |
| |   chroma_sample_loc_type_bottom_field } | ue(v) |
| | neutral_chroma_indication_flag | u(1) |
| 336 → | field_seq_flag | u(1) |
| 350 → | hrd_parameters( 1, sps_max_sub_layers_minus1 ) | |
| 360 → | bitstream_restriction_flag | u(1) |
| | if( bitstream_restriction_flag ) { | |
| 362 → |   tiles_fixed_structure_flag | u(1) |
| 364 → |   motion_vectors_over_pic_boundaries_flag | u(1) |
| 366 → |   max_bytes_per_pic_denom | ue(v) |
| 368 → |   max_bits_per_mincu_denom | ue(v) |
| 370 → |   log2_max_mv_length_horizontal | ue(v) |
| 372 → |   log2_max_mv_length_vertical } } | ue(v) |

VIDEO CODING SYSTEM WITH TEMPORAL LAYERS AND METHOD OF OPERATION THEREOF

CROSS-REFERENCE TO RELATED APPLICATION

The present application is a continuation application of U.S. patent application Ser. No. 13/757,624, filed on Feb. 1, 2013, which claims benefit of priority from U.S. Provisional Patent Application 61/677,302 filed on Jul. 30, 2012 and U.S. Provisional Patent Application 61/667,269 filed on Jul. 2, 2012, the entire contents of each of the above are hereby incorporated by reference.

TECHNICAL FIELD

The present invention relates generally to video systems, and more particularly to a system for video coding.

BACKGROUND ART

The deployment of high quality video to smart phones, high definition televisions, automotive information systems, and other video devices with screens has grown tremendously in recent years. The wide variety of information devices supporting video content requires multiple types of video content to be provided to devices with different size, quality, and connectivity capabilities.

Video has evolved from two dimensional single view video to multiview video with high-resolution three dimensional imagery. In order to make the transfer of video more efficient, different video coding and compression schemes have tried to get the best picture from the least amount of data. The Moving Pictures Experts Group (MPEG) developed standards to allow good video quality based on a standardized data sequence and algorithm. The H.264 (MPEG4 Part 10)/Advanced Video Coding design was an improvement in coding efficiency typically by a factor of two over the prior MPEG-2 format. The quality of the video is dependent upon the manipulation and compression of the data in the video. The video can be modified to accommodate the varying bandwidths used to send the video to the display devices with different resolutions and feature sets. However, distributing larger, higher quality video, or more complex video functionality requires additional bandwidth and improved video compression.

Thus, a need still remains for a video coding system that can deliver good picture quality and features across a wide range of device with different sizes, resolutions, and connectivity. In view of the increasing demand for providing video on the growing spectrum of intelligent devices, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to save costs, improve efficiencies and performance, and meet competitive pressures, adds an even greater urgency to the critical necessity for finding answers to these problems.

Solutions to these problems have long been sought but prior developments have not taught or suggested any solutions and, thus, solutions to these problems have long eluded those skilled in the art.

DISCLOSURE OF THE INVENTION

The present invention provides a method of operation of a video coding system including: receiving a video bitstream; extracting a video syntax from the video bitstream; extracting a temporal layer from the video bitstream based on the video syntax; and forming a video stream based on the temporal layer for displaying on a device.

The present invention provides a video coding system, including: a receive module for receiving a video bitstream; a get syntax module, coupled to the receive module, for extracting a video syntax from the video bitstream; a decode module, coupled to the get syntax module, for extracting a temporal layer from the video bitstream based on the video syntax; and a display module, coupled to the decode module, for forming a video stream based on the temporal layer for displaying on a device.

Certain embodiments of the invention have other aspects in addition to or in place of those mentioned above. The aspects will become apparent to those skilled in the art from a reading of the following detailed description when taken with reference to the accompanying drawings.

BRIEF DESCRIPTION OF THE DRAWINGS

FIG. 3 is an example of a High Efficiency Video Coding (HEVC) Video Usability Information (VUI) syntax
FIG. 4 is an example of a HEVC VUI first extension syntax.
FIG. 5 is an example of a HEVC VUI second extension syntax.
FIG. 6 is an example of a HRD syntax.
FIG. 7 is an example of a HRD sub-layer syntax.
FIG. 8 is an example of a HRD VUI syntax

BEST MODE FOR CARRYING OUT THE INVENTION

Figure 1:
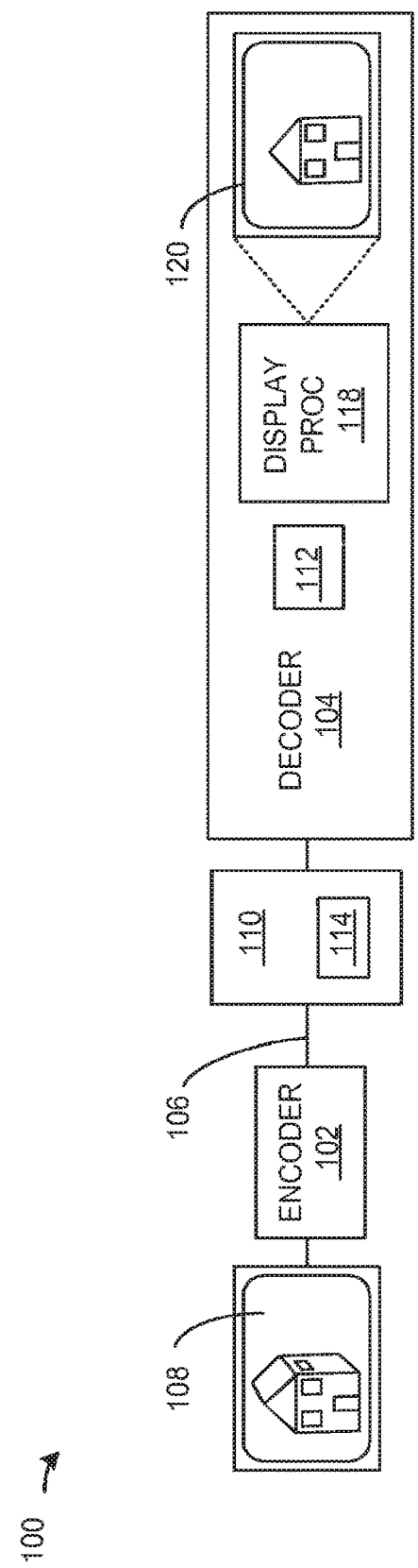
FIG. 1 is a block diagram of a video coding system in an embodiment of the present invention.

The following embodiments are described in sufficient detail to enable those skilled in the art to make and use the invention. It is to be understood that other embodiments would be evident based on the present disclosure, and that process or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

Likewise, the drawings showing embodiments of the system are semi-diagrammatic and not to scale and, particularly, some of the dimensions are for the clarity of presentation and are shown greatly exaggerated in the drawing FIGS. Where multiple embodiments are disclosed and described, having some features in common, for clarity and ease of illustration, description, and comprehension thereof, similar and like features one to another will ordinarily be described with like reference numerals.

The term "syntax" means the set of elements describing a data structure. The term "module" referred to herein can include software, hardware, or a combination thereof in the present invention in accordance with the context used.

Referring now to FIG. 1, therein is shown a block diagram of a video coding system 100 in an embodiment of the present invention. A video encoder 102 can receive a video content 108 and send a video bitstream 110 to a video decoder 104 for decoding and display on a display interface 120.

The video encoder 102 can receive and encode the video content 108. The video encoder 102 is a unit for encoding the video content 108 into a different form. The video content 108 is defined as a digital representation of a scene of objects. For example, the video content 108 can be the digital output of one or more digital video cameras.

Encoding is defined as computationally modifying the video content 108 to a different form. For example, encoding can compress the video content 108 into the video bitstream 110 to reduce the amount of data needed to transmit the video bitstream 110.

In another example, the video content 108 can be encoded by being compressed, visually enhanced, separated into one or more views, changed in resolution, changed in aspect ratio, or a combination thereof. In another illustrative example, the video content 108 can be encoded according to the High-Efficiency Video Coding (HEVC)/H.265 draft standard.

The video encoder 102 can encode the video content 108 to form the video bitstream 110. The video bitstream 110 is defined a sequence of bits representing information associated with the video content 108. For example, the video bitstream 110 can be a bit sequence representing a compression of the video content 108. In another example, the video bitstream 110 is a series of bits representing the video content 108 that is transmitted serially over time.

The video encoder 102 can receive the video content 108 for a scene in a variety of ways. For example, the video content 108 representing objects in the real-world can be captured with a video camera, multiple cameras, generated with a computer, provided as a file, or a combination thereof.

The video content 108 can include a variety of video features. For example, the video content 108 can include single view video, multiview video, stereoscopic video, or a combination thereof. In a further example, the video content 108 can be multiview video of four or more cameras for supporting three-dimensional (3D) video viewing without 3D glasses.

The video encoder 102 can encode the video content 108 using a video syntax 114 to generate the video bitstream 110. The video syntax 114 is defined as a set of information elements that describe a coding methodology for encoding and decoding the video content 108. The video bitstream 110 is compliant with the video syntax 114, such as the High-Efficiency Video Coding/H.265 standard, and can include a HEVC video bitstream, an Ultra High Definition video bitstream, or a combination thereof. The video bitstream 110 can include the video syntax 114.

The video bitstream 110 can include information representing the imagery of the video content 108 and the associated control information related to the encoding of the video content 108. For example, the video bitstream 110 can include an occurrence of the video syntax 114 and an occurrence of the video content 108.

The video coding system 100 can include the video decoder 104 for decoding the video bitstream 110. The video decoder 104 is defined as a unit for receiving the video bitstream 110 and modifying the video bitstream 110 to form a video stream 112.

The video decoder 104 can decode the video bitstream 110 to form the video stream 112 using the video syntax 114. Decoding is defined as computationally modifying the video bitstream 110 to form the video stream 112. For example, decoding can decompress the video bitstream 110 to form the video stream 112 formatted for displaying on the display the display interface 120.

The video stream 112 is defined as a computationally modified version of the video content 108. For example, the video stream 112 can include a modified occurrence of the video content 108 with different resolution. The video stream 112 can include cropped decoded pictures from the video content 108.

In a further example, the video stream 112 can have a different aspect ratio, a different frame rate, different stereoscopic views, different view order, or a combination thereof than the video content 108. The video stream 112 can have different visual properties including different color parameters, color planes, contrast, hue, or a combination thereof.

The video coding system 100 can include a display processor 118.

The display processor 118 can receive the video stream 112 from the video decoder 104 for display on the display interface 120.

The display interface 120 is a unit that can present a visual representation of the video stream 112.

For example, the display interface 120 can include a smart phone display, a digital projector, a DVD player display, or a combination thereof. Although the video coding system 100 shows the video decoder 104, the display processor 118, and the display interface 120 as individual units, it is understood that the video decoder 104 can include the display processor 118 and the display interface 120.

The video encoder 102 can send the video bitstream 110 to the video decoder 104 over a communication path 106. The communication path 106 can be a variety of networks suitable for data transfer.

For example, the communication path 106 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 106. Ethernet, digital subscriber line (DSL), fiber to the home (FTTH), and plain old telephone service (POTS) are examples of wired communication that can be included in the communication path 106.

The video coding system 100 can employ a variety of video coding syntax structures. For example, the video coding system 100 can encode and decode video information using the High Efficiency Video Coding/H.265 working draft version. The HEVC working draft version is described in documents that are hereby included by reference in their entirety. The documents incorporated by reference in their entirety include:

B. Bross, W. Han, J Ohm, G. Sullivan, T. Wiegand, "High-Efficiency Video Coding (HEVC) text specification draft 8", JCTVC-11003 d7, July 2012 (Stockholm).

B. Bross, W. Han, J. Ohm, G. Sullivan, T. Wiegand, "High Efficiency Video Coding (HEVC) text specification draft 7" JCTVC-11003 d4, May 2012 (Geneva).

M. Hague, K. Sato, A. Tabatabai, T. Suzuki, "HEVC VUI Parameters with Extension Hooks", JCTVC-10270, July 2012 (Stockholm).

M. Hague, A. Tabatabai, "Extension of HEVC VUI Syntax Structure", JCTVC-I0263, May 2012.

M. Hague, "AHGIO: VUI and HRD syntax designs agreed by the BoG on VPS and NUH", JCTVC-J0548rl, July 2012.

Figure 2:
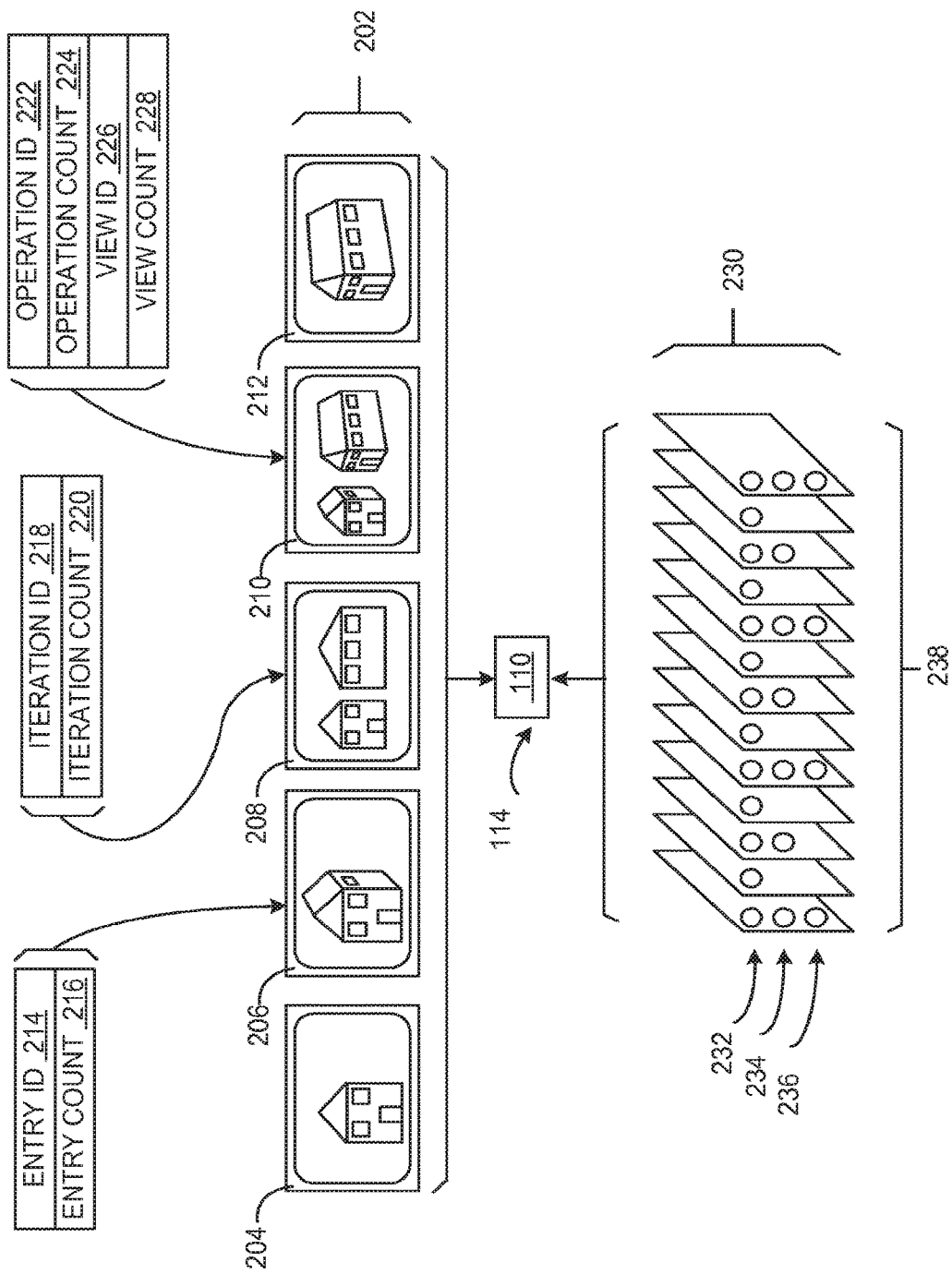
FIG. 2 is an example of the video bitstream.

Referring now to FIG. 2, therein is shown an example of the video bitstream 110. The video bitstream 110 includes an encoded occurrence of the video content 108 of FIG. 1 and can be decoded using the video syntax 114 to form the video stream 112 of FIG. 1 for display on the display interface 120 of FIG. 1.

The video bitstream 110 can include a variety of video types as indicated by a syntax type 202. The syntax type 202 is defined as an indicator of the type of video coding used to encode and decode the video bitstream 110. For example, the video content 108 can include the syntax type 202 for advanced video coding 204 (AVC), scalable video coding 206 (SVC), multiview video coding 208 (MVC), multiview video plus depth 210 (MVD), and stereoscopic video 212 (SSV).

The advanced video coding 204 and the scalable video coding 206 can be used to encode single view based video to form the video bitstream 110. The single view-based video can include the video content 108 generate from a single camera.

The multiview video coding 208, the multiview video plus depth 210, and the stereoscopic video 212 can be used to encode the video content 108 having two or more views. For example, multiview video can include the video content 108 from multiple cameras.

The video syntax 114 can include an entry identifier 214. The entry identifier 214 is a value for differentiating between multiple coded video sequences. The coded video sequences can include occurrences of the video content 108 having a different bitrate, frame-rate, resolution, or scalable layers for a single view video, multiview video, or stereoscopic video.

The video syntax 114 can include an entry count 216 for identifying the number of entries associated with each frame in the video content 108. The entry count 216 is the maximum number of entries represented in the video content 108.

The video syntax 114 can include an iteration identifier 218. The iteration identifier 218 is a value to differentiate between individual iterations of the video content 108.

The video syntax 114 can include an iteration count 220. The iteration count 220 is a value indicating the maximum number of iterations of the video content 108.

For scalable video coding, the term iteration count can be used to indicate the number of information entries tied to different scalable video layers in the case of scalable video coding. For multiview video coding, the iteration count can be used to indicate the number of operation points tied to the number of views of the video content 108.

For example, in scalable video coding, the video content 108 can be encoded to include a base layer with additional enhancement layers to form multi-layer occurrences of the video bitstream 110. The base layer can have the lowest resolution, frame-rate, or quality.

The enhancement layers can include gradual refinements with additional left-over information used to increase the quality of the video. The scalable video layer extension can include a new baseline standard of HEVC that can be extended to cover scalable video coding.

The video syntax 114 can include an operation identifier 222. The operation identifier 222 is a value to differentiate between individual operation points of the video content 108. The operation points are information entries present for multiview video coding, such as timing information, network abstraction layer (NAL) hypothetical referenced decoder (HRD) parameters, video coding layer (VCL) HRD parameters, a pic_struct_present_flag element, or a combination thereof.

The video syntax 114 can include an operation count 224. The operation count 224 is a value indicating the maximum number of operations of the video content 108.

The operation points are tied to generation of coded video sequences from various views, such as views generated by different cameras, for multiview and 3D video. For multiview video coding, an operation point is associated with a subset of the video bitstream 110 having a target output view and the other views dependent on the target output view. The other views are dependent on the target output view if they are derived using a sub-bitstream extraction process. More than one operation point may be associated with the same subset of the video bitstream 110. For example, decoding an operation point refers to the decoding of the subset of the video bitstream corresponding to the operation point and subsequent output of the target output views as a portion of the video stream 112 for display on the device 102 of FIG. 1.

The video syntax 114 can include a view identifier 226. The view identifier 226 is a value to differentiate between individual views of the video content 108.

The video syntax 114 can include a view count 228. The view count 228 is a value indicating the maximum number of views of the video content 108.

For example, a single view can be a video generated by a single camera. Multiview video can be generated by multiple cameras situated at different positions and distances from the objects being viewed in a scene.

The video content 108 can include a variety of video properties. For example, the video content 108 can be high resolution video, such as Ultra High Definition video. The video content 108 can have a pixel resolution of 3840×2160 or higher, including resolutions of 7680×4320, 8K×2K, 4K×2K, or a combination thereof. Although the video content 108 supports high resolution video, it is understood that the video content 108 can also support lower resolutions, such as high definition (HD) video. The video syntax 114 can support the resolution of the video content 108.

The video content 108 can support a variety of frame rates including 15 frames per second (fps), 24 fps, 25 fps, 30 fps, 50 fps, 60 fps, and 120 fps. Although individual frame rates are described, it is understood that the video content 108 can support fixed and variable frame rates of zero frames per second and higher. The video syntax 114 can support the frame rate of the video content 108.

The video bitstream 110 can include one or more temporal layers 230. The temporal layers 230 are defined as portions of the video bitstream 110 representing the video stream 112 at a specified frame rate. Each of the temporal layers 230 can represent the video stream 112 at a different frame rate expressed as frames per second (fps). The temporal layers 230 can form a hierarchy with higher layers including the lower layers.

For example, a first occurrence 232 of the temporal layers 230 can represent a 15 fps occurrence of the video stream 112, a second occurrence 234 of the temporal layers 230 can represent a 30 fps occurrence of the video stream 112, and a third occurrence 236 of the temporal layers 230 can represent a 60 fps occurrence of the video stream 112. Each of the temporal layers 230 can include video frames 238 representing the video content 108.

The first occurrence 232 of the temporal layers 230 can represent a base layer that encodes the video content 108 to form the video stream 112 at 15 fps. The second occurrence 234 of the temporal layers 230 can represent the difference between the base layer, such as the first occurrence 232 of the temporal layers 230, and the video stream 112 of the video content 108 at 30 fps.

The second occurrence 234 can includes frames that represent the difference between the frames of the base layer and the new frames required for displaying the video content 108 at 30 fps. The third occurrence 236 of the temporal layers 230 can represent the difference between the second occurrence 234 of the temporal layers 230 and the video content at 60 fps.

In an illustrative example, the video decoder 104 of FIG. 1 for a smart phone can extract the second occurrence 234 of the temporal layers 230 at 30 fps from the video bitstream 110, which can include the information from the first occurrence 232 and the second occurrence 234. The information in the video bitstream 110 from the third occurrence 236 of the temporal layers 230 can be discarded to reduce the size of the video bitstream 110.

Referring now to FIG. 3, therein is shown an example of a High Efficiency Video Coding (HEVC) Video Usability Information (VUI) syntax 302. The HEVC VUI syntax 302 includes information about the video bitstream 110 of FIG. 1 to permit additional application usability features for the video content 108 of FIG. 1.

The HEVC VUI syntax 302 describes the elements in the HEVC VUI syntax table of FIG. 3. The elements of the HEVC VUI syntax 302 are arranged in a hierarchical structure as described in the HEVC VUI syntax table of FIG. 3.

The HEVC VUI syntax 302 includes a HEVC VUI syntax header 303, such as a vui_parameters element. The HEVC VUI syntax header 303 is a descriptor for identifying the HEVC VUI syntax 302. The HEVC VUI syntax 302 is used to encode and decode the video bitstream 110.

The HEVC VUI syntax 302 can include a variety of information about the video bitstream 110. The HEVC VUI syntax 302 can include information about the aspect ratio for the video content 108, overscanning, video signal type, chroma, the NAL HRD values, bitstream restrictions, or a combination thereof.

The HEVC VUI syntax 302 can include aspect ratio information about the aspect ratio of the video content 108. The HEVC VUI syntax 302 can include an aspect ratio flag 304, an aspect ratio indicator 306, an aspect ratio width 308 and an aspect ratio height 310, or a combination thereof.

The HEVC VUI syntax 302 can include the aspect ratio flag 304, such as the aspect_ratio_info_present_flag element, to show that additional aspect ratio information is encoded in the video bitstream 110. The aspect ratio flag 304 can have a value 0 to indicate that aspect ratio information is not in the video bitstream 110 and a value of 1 to indicate that aspect ratio information is included in the video bitstream 110.

The aspect ratio indicator 306 is a value describing the aspect ratio of the video content 108. For example, the aspect ratio indicator 306, such as the aspect_ratio_idc element, can include an index value for an enumerated list of predefined aspect ratios for the video content 108. In a further example, the aspect ratio indicator 306 can include a value indicating that the aspect ratio can be described by individual values for the aspect ratio width 308 and the aspect ratio height 310.

The aspect ratio width 308, such as the sar_width element, can describe the width of the video content 108. The aspect ratio height 310, such as the sar_height element, can describe the height of the video content 108. The aspect ratio width 308 and the aspect ratio height 310 can describe the dimensions of the video content in ratios, pixels, lines, inches, centimeters, or a combination thereof.

The HEVC VUI syntax 302 can include overscan information for the video content 108. The HEVC VUI syntax 302 can include an overscan present flag 312 and an overscan appropriate flag 314.

Overscan is defined as display processes in which some parts near the borders of the cropped decoded pictures of the video stream 112 of FIG. 1 are not visible in the display area of the video stream 112. Underscan is defined as display processes in which the entire cropped decoded pictures of the video stream 112 are visible in the display area, but do not cover the entire display area.

The overscan present flag 312 can indicate if overscan information is included in the video bitstream 110. The overscan present flag 312, such as the overscan_info_present_flag, can have a value of 1 to indicate that overscan information is present in the video bitstream or a value of 0 to indicate that overscan information is not present in the video bitstream 110.

The overscan appropriate flag 314 can indicate that the video content 108 encoded in the video bitstream 110 can be displayed using overscan. The overscan appropriate flag 314, such as an overscan_appropriate_flag element, can have a value of 1 to indicate that the cropped decoded pictures of the video stream 112 are suitable for display using overscan. The overscan appropriate flag 314 can have a value of zero to indicate that the cropped decoded pictures of the video stream 112 contain visually important information and should not be displayed using overscan.

The HEVC VUI syntax 302 can include video signal type information for the video content 108. The HEVC VUI syntax 302 can include a video signal present flag 316, a video format 317, a video full range flag 318, a color description present flag 320, a color primaries 322, a transfer characteristics 324, and a matrix coefficient 326.

The video signal present flag 316, such as the video_signal_type_present_flag element, can indicate that video signal type information is included in the video bitstream 110. The video signal present flag 316 can have a value of 1 to indicate that additional video signal type information is present in the video bitstream 110. The video signal present flag 316 can have a value of 0 to indicate that no video signal type information is present in the video bitstream 110.

The video format 317, such as the video_format element, can indicate the format of the video. The video full range flag 318, such as the video_full_range_flag element, can indicate the black level and the range of the luma and chroma signals for the video content 108 encoded in the video bitstream 110.

The color description present flag 320, such as the colour_description_present_flag element, can indicate the presence of color description information in the video bitstream 110. The color description present flag 320 can have a value of 1 to indicate that additional color description information is included in the video bitstream 110. The color description present flag 320 can have a value of 0 to indicate that no other color description information is included. The color description information can include the color primaries 322, the transfer characteristics 324, and the matrix coefficient 326.

The color primaries 322 can indicate the color scheme used in the video content 108. For example, the color primaries 322, such as the colour_primaries element, can indicate the chromaticity coordinates of the source primaries.

The transfer characteristics 324 can indicate the opto-electronic transfer characteristics of the video content 108. For example, the transfer characteristics 324, such as the transfer_characteristics element, can be an enumerated value describing a predefined set of display characteristics.

The matrix coefficient 326 can indicate coefficient used to derive luma and chroma signals from the red, green, and blue primaries indicated by the color primaries 322. The matrix coefficient 326, such as the matrix_coefficient element, can be matrix coefficient used to computationally transform a set of red, blue, and green color coordinates to luma and chroma equivalents.

The HEVC VUI syntax 302 can include chroma information for the video content 108. The HEVC VUI syntax 302 can include a chroma loc information present flag 328, a chroma top field sample 330, a chroma bottom field sample 332, and a neutral chroma flag 334.

The chroma_loc_information_present_flag 328, such as the chroma_loc_info_present_flag element, can indicate whether additional chroma information is present in the video bitstream 110. The chroma loc information present flag 328 can have a value of 1 to indicate that additional chroma information is present or a value of 0 to indicate that no additional chroma information is present. The additional chroma information can include the chroma top field sample 330 and the chroma bottom field sample 332.

The chroma top field sample 330, such as the chroma_sample_loc_type_top_field element, can be an enumerated value to specify the location of chroma samples for the top field in the video bitstream 110. The chroma bottom field sample 332, such as the chroma_sample_loc_type_bottom_field element, can be an enumerated value to specify the location of chroma samples for the bottom field in the video bitstream 110.

The neutral chroma flag 334, such as the neutral_chroma_indication_flag element, can indicate whether the decoded chroma samples are equal to one. For example, if the neutral chroma flag 334 has a value of 1, then all of the decoded chroma samples are set to 1. If the neutral chroma flag 334 has a value of 0, then the decoded chroma samples are not limited to 1.

The HEVC VUI syntax 302 can include field sequence information about the video bitstream 110. The HEVC VUI syntax 302 can include a field sequence flag 336, a timing information present flag 338, a tick units 340, a time scale 344, and a fixed picture rate flag 346.

The field sequence flag 336, such as the field_seq_flag, can indicate whether coded video sequence information includes video representing fields. The field sequence flag 336 can have a value of 1 to indicate the presence of fields and a value of 0 to indicate no fields are present.

The timing information present flag 338, such as the timing_info_present_flag element, can indicate whether timing information is included in the video bitstream 110. The timing information present flag 338 can have a value of 1 to indicate timing information is in the video bitstream 110 and a value of 0 to indicate that timing information is not included in the video bitstream 110.

The tick units 340, such as the num_units_in_tick element, can indicate the number of time units of a clock operating at the frequency of the time scale 344. For example, the tick units 340 can have corresponding to the minimum interval of time that can be represented in the video bitstream 110. The time scale 344, such as the time_scale element, is the number of time units that pass in one second.

The fixed picture rate flag 346, such as the fixed_pic_rate_flag element, can indicate the whether the temporal distance between two consecutive pictures in the output order of the video stream 112 is constrained. The fixed picture rate flag 346 has a value of 0 to indicate that no constraint applies and a value of 1 to indicate that the temporal distance is constrained.

The HEVC VUI syntax 302 can include information related to the hypothetical reference decoder parameters. The HEVC VUI syntax 302 can include a NAL HRD parameters present flag 348, a VCL HRD parameters present flag 352, and a HRD parameters structure 350.

The NAL HRD parameters present flag 348, such as the nal_hrd_parameters_present_flag element, can indicate the presence of the NAL HRD parameter information. The NAL HRD parameters present flag 348 can have a value of 1 to indicate that the HRD parameters structure 350 is present and a value of 0 to indicate the HRD parameters structure 350 is not present in the HEVC VUI syntax 302.

The VCL HRD parameters present flag 352, such as the vcl_hrd_parameters_present_flag element, can indicate the presence of the HRD information for VCL. The VCL HRD parameters present flag 352 can have a value of 1 to indicate that the HRD parameters structure 350 is present and a value of 0 to indicate the HRD parameters structure 350 is not present in the HEVC VUI syntax 302.

The HRD parameters structure 350 can include the hypothetical reference decoder parameters for VCL. The HRD parameters structure 350 is described in detail in the HRD syntax section below. The HRD parameters structure 350 is an occurrence of a HRD syntax. If the NAL HRD parameters present flag 348 or the VCL HRD parameters present flag 352 have a value of 1, then the HEVC VUI syntax 302 can include additional HRD parameters and bitstream parameters.

The HEVC VUI syntax 302 can include the low delay HRD flag 354, a sub-picture coded picture buffer (CPB) parameters present flag 356, and a subunit ticks 358.

The HEVC VUI syntax 302 can include the low delay HRD flag 354, such as the low_delay_hrd_flag element. The low delay HRD flag 354 can indicates the HRD operational mode.

The HEVC VUI syntax 302 can include the sub-picture CPB parameters present flag 356, such as the sub_pic_cpb_params_present_flag element. The sub-picture CPB parameters present flag 356 can indicate if sub-picture CPB parameters are present in the video bitstream 110.

If the sub-picture CPB parameters present flag 356 have a value of 1, then the HEVC VUI syntax 302 can include the subunit ticks 358, such as the num_of_units_in_sub_tick element. The subunit ticks 358 can indicate the number of ticks to wait before removing timing supplemental enhancement information (SEI) messages.

If the NAL HRD parameters present flag 348 or the VCL HRD parameters present flag 352 have a value of 1, then the HEVC VUI syntax 302 can include bitstream parameters. The HEVC VUI syntax 302 can include bitstream restriction information about the video bitstream 110. The HEVC VUI syntax 302 can include a bitstream restriction flag 360, a tiles fixed structure flag 362, a motion vector flag 364, a max bytes per picture denomination 366, a maximum bits per minimum cu denomination 368, a maximum motion vector horizontal length 370, and a maximum motion vector vertical length 372.

The bitstream restriction flag 360, such as a bitstream_restriction_flag element, indicates that the coded video sequence bitstream restriction parameters are present in the video bitstream 110.

The bitstream restriction flag 360 has a value of 1 if the bitstream restriction parameters are present and a value of 0 if the bitstream restriction parameters are not present in the video bitstream 110. The bitstream restriction parameters can include the tiles fixed structure flag 362, the motion vector flag 364, the max bytes per picture denomination 366, the maximum bits per minimum cu denomination 368, the maximum motion vector horizontal length 370, and the maximum motion vector vertical length 372. The tiles fixed structure flag 362, such as a tiles_fixed_structure_flag element, can indicate that each picture in the coded video sequence has the same number of tiles. The tiles fixed structure flag 362 can have to value of 1 to indicate that fixed tiles and a value of 0 to indicate otherwise.

The motion vector flag 364, such as a motion_vector_over_pic_boundaries_flag element, can indicate that no sample outside the picture boundaries is used for prediction. If the motion vector flag 364 has a value of 1, then one or more samples outside the picture boundaries may be used for prediction, otherwise no samples are used for prediction.

The max bytes per picture denomination 366, such as a max_bytes_per_pic_denom element, is a value indicating the maximum number of bytes for the sum of the sizes of the VCL NAL units associated with any coded picture in the coded video sequence. If the max bytes per picture denomination 366 has a value of 0, then no limits are indicated. Otherwise, it is a requirement of bitstream conformance that no coded pictures shall be represented in the video bitstream 110 by more bytes than the max bytes per picture denomination 366.

The maximum bits per minimum cu denomination 368, such as a max_bits_per_min_cu_denom element, is a value indicating the an upper bound for the number of coded bits of coding unit data for any coding block in any picture of the coded video sequence. If the maximum bits per minimum cu denomination 368 has a value of 0, then no limit is indicated. Otherwise, is a requirement of bitstream conformance that no coding unit shall be represented in the bitstream by more than the maximum bits per minimum cu denomination 368.

The maximum motion vector horizontal length 370, such as a log2_max_mv_length_horizontal element, indicates the maximum absolute value of a decoded horizontal motion vector component for all pictures in the video bitstream 110. The maximum motion vector vertical length 372, such as a log 2 max mv length vertical element, indicates the maximum absolute value of a decoded vertical motion vector component for all pictures in the video bitstream 110.

Referring now to FIG. 4, therein is shown an example of a HEVC VUI first extension syntax 402. The HEVC VUI first extension syntax 402 provides separate timing information for each occurrence of the temporal layers 230 of FIG. 2 in the video bitstream 110 of FIG. 1.

The HEVC VUI first extension syntax 402 describes the elements in the HEVC VUI first extension syntax table of FIG. 4. The elements of the HEVC VUI first extension syntax 402 are arranged in a hierarchical structure as described in the HEVC VUI first extension syntax table of FIG. 4. For example, the HEVC VUI first extension syntax 402 can be an extension of the HEVC VUI syntax 302 of FIG. 3.

The HEVC VUI first extension syntax 402 includes a HEVC VUI first extension syntax header 404, such as the vui_parameters element. The HEVC VUI first extension syntax header 404 is a descriptor for identifying the HEVC VUI first extension syntax 402. The HEVC VUI first extension syntax 402 is used to encode and decode the video bitstream 110.

The HEVC VUI first extension syntax 402 can include a subset of the VUI parameters related to the field sequence flag 336 and the timing information present flag 338 for each temporal layer in the video bitstream 110. Terms such as first or second are used for identification purposes only and do not indicate any order, priority, importance, or precedence.

The HEVC VUI first extension syntax 402 can include a temporal layer count 406, such as vui_max_temporal_layers_minus1 element, for identifying the maximum number of temporal layers associated with each frame in the video bitstream 110 of FIG. 1. The temporal layer count 406 indicates the number of entries minus 1 to map the temporal layer count 406 from 0 to the number of temporal layers minus 1.

The HEVC VUI first extension syntax 402 can include a loop structure to represent the temporal layer specific information. The loop can include an iterator, such as [i], for indicating the information associated with each occurrence of the temporal layers 230 from 0 to the temporal layer count 406. The HEVC VUI first extension syntax 402 supports separate syntax elements for a number of occurrences of the temporal layers 230 equal to the temporal layer count 406.

The HEVC VUI first extension syntax 402 includes elements as described in the HEVC VUI first extension syntax table of FIG. 4. The elements of the HEVC VUI first extension syntax 402 are arranged in a hierarchical structure as described in the HEVC VUI first extension syntax table of FIG. 4.

The HEVC VUI first extension syntax 402 includes the timing information such as the field sequence flag 336, the timing information present flag 338, the tick units 340, the time scale 344, and the fixed picture rate flag 346. The HEVC VUI first extension syntax 402 can include NAL HRD information such as the NAL HRD parameters present flag 348, the HRD parameters structure 350, the VCL HRD parameters present flag 352, the low delay HRD flag 354, the sub-picture CPB parameters present flag 356, and the sub-unit ticks 358.

The HEVC VUI first extension syntax 402 can include field sequence information for each occurrence of the temporal layers 230. The HEVC VUI first extension syntax 402 can include the field sequence flag 336, the timing information present flag 338, the tick units 340, the time scale 344, and the fixed picture rate flag 346.

The HEVC VUI first extension syntax 402 can include the hypothetical reference decoder parameters for each occurrence of the temporal layers 230. The HEVC VUI first extension syntax 402 can include the NAL HRD parameters present flag 348, the VCL HRD parameters present flag 352, and the HRD parameters structure 350.

The NAL HRD parameters present flag 348, such as the nal_hrd_parameters_present_flag element, can indicate the presence of the NAL HRD parameter information. The NAL HRD parameters present flag 348 can have a value of 1 to indicate that the HRD parameters structure 350 is present and a value of 0 to indicate the HRD parameters structure 350 is not present in the video bitstream 110.

The VCL HRD parameters present flag 352, such as the vcl_hrd_parameters_present_flag element, can indicate the presence of the HRD information for VCL. The VCL HRD parameters present flag 352 can have a value of 1 to indicate that the HRD parameters structure 350 is present and a value of 0 to indicate the HRD parameters structure 350 is not present in the video bitstream 110.

The HEVC VUI first extension syntax 402 can include the HRD parameters structure 350. The HRD parameters structure 350 can include parameters describing the hypothetical reference decoder. The HRD parameters structure 350 is further defined in the sections below.

If the NAL HRD parameters present flag 348 or the VCL HRD parameters present flag 352 have values of 1, then the HEVC VUI first extension syntax 402 can include the low delay HRD flag 354, the sub-picture CPB parameters present flag 356, and the subunit ticks 358.

The HEVC VUI first extension syntax 402 can include information about the bitstream, the VUI extension, and the RBSP information outside of the loop structure. The bitstream, VUI extension, and RBSP information is constant for all of the temporal layers.

The HEVC VUI first extension syntax 402 can include a VUI extension flag 408, such as the vui_extension_flag element, for indicating that VUI extension information is included in the video bitstream 110. The VUI extension flag 408 can have a value of 1 to indicate that VUI extension information is included in the video bitstream 110 and a value of 0 to indicate otherwise.

The HEVC VUI first extension syntax 402 can include a more RBSP data flag 410, such as the more_rbsp_data element, for indicating that additional data is in the RBSP. The more RBSP data flag 410 can have a value of 1 when additional data is in the RBSP and a value of 0 otherwise.

The HEVC VUI first extension syntax 402 can include a VUI extension data flag 412, such as the VUI_extension_data_flag element, for indicating that VUI extension data is included in the video bitstream 110. The VUI extension data flag 412 can have a value of 1 when the VUI extension data is included in the video bitstream 110 and a value of 0 otherwise.

The HEVC VUI first extension syntax 402 can include a RBSP trailing bits 414, such as a rbsp_trailing_bits element, which is a data structure for flagging RBSP data. The RBSP trailing bits 414 can include the RBSP data, such as the rbsp_stop_one_bit element, for indicating the stop bit for the RBSP.

It has been discovered that encoding and decoding the video content 108 of FIG. 1 using the HEVC VUI first extension syntax 402 to support each occurrence of the temporal layer provides finer grained control over the representation of each occurrence of the temporal layers 230. Providing information for each occurrence of the temporal layers 230 increases the quality of display of the video stream 112 of FIG. 1.

Referring now to FIG. 5, therein is shown an example of a HEVC VUI second extension syntax 502. The HEVC VUI second extension syntax 502 includes a single occurrence the VUI parameters related to the field sequence flag 336 and the timing information present flag 338 for all temporal layers in the video bitstream 110 of FIG. 1.

The HEVC VUI second extension syntax 502 describes the elements in the HEVC VUI second extension syntax table of FIG. 5.

The elements of the HEVC VUI second extension syntax 502 are arranged in a hierarchical structure as described in the HEVC VUI second extension syntax table of FIG. 5. For example, the HEVC VUI second extension syntax 502 can be an extension of the HEVC VUI syntax 302 of FIG. 3.

The HEVC VUI second extension syntax 502 includes a HEVC VUI second extension syntax header 504, such as the v7.li_parameters element. The HEVC VUI second extension syntax header 504 is a descriptor for identifying the HEVC VUI second extension syntax 502.

The HEVC VUI second extension syntax 502 includes a loop with the HRD parameters structure 350 for each of the temporal layers 230 of FIG. 2. Terms such as first or second are used for identification purposes only and do not indicate any order, priority, importance, or precedence.

The HEVC VUI second extension syntax 502 can include a common set of timing information such as the field sequence flag 336, the timing information present flag 338, the tick units 340, the time scale 344, and the fixed picture rate flag 346. The common set of timing information is constant across all occurrences of the temporal layers 230.

The HEVC VUI second extension syntax 502 can include the temporal layer count 406, such as vui_max_temporal_layers_minus1 element, for identifying the maximum number of temporal layers associated with each frame in the video bitstream 110. The temporal layer count 406 indicates the number of entries minus 1 to map the temporal layer count 406 from 0 to the number of temporal layers minus 1.

The HEVC VUI second extension syntax 502 can include a loop structure to represent the temporal layer specific information. The loop can include an iterator, such as [i], for indicating the information associated with each occurrence of the temporal layers 230 from 0 to the temporal layer count 406. The HEVC VUI second extension syntax 502 supports separate syntax elements for a number of occurrences of the temporal layers 230 equal to the temporal layer count 406.

The HEVC VUI second extension syntax 502 includes elements as described in the HEVC VUI second extension syntax table of FIG. 5. The elements of the HEVC VUI second extension syntax 502 are arranged in a hierarchical structure as described in the HEVC VUI second extension syntax table of FIG. 5.

The HEVC VUI second extension syntax 502 can include the hypothetical reference decoder parameters for each occurrence of the temporal layers 230. The HEVC VUI second extension syntax 502 can include the NAL HRD parameters present flag 348, the VCL HRD parameters present flag 352, and the HRD parameters structure 350.

The NAL HRD parameters present flag 348, such as the nal_hrd_parameters_present_flag element, can indicate the presence of the NAL HRD parameter information. The NAL HRD parameters present flag 348 can have a value of 1 to indicate that the HRD parameters structure 350 is present and a value of 0 to indicate the HRD parameters structure 350 is not present in the video bitstream 110.

The VCL HRD parameters present flag 352, such as the vcl_hrd_parameters_present_flag element, can indicate the presence of the HRD information for VCL. The VCL HRD parameters present flag 352 can have a value of 1 to indicate that the HRD parameters structure 350 is present and a value of 0 to indicate the HRD parameters structure 350 is not present in the video bitstream 110.

The HEVC VUI second extension syntax 502 can include the HRD parameters structure 350. The HRD parameters structure 350 can include parameters describing the hypothetical reference decoder. The HRD parameters structure 350 is further defined in the sections below.

If the NAL HRD parameters present flag 348 or the VCL HRD parameters present flag 352 have values of 1, then the HEVC VUI second extension syntax 502 can include the low delay HRD flag 354 and the sub-picture CPB parameters present flag 356. If the sub-picture CPB parameters present flag 356 is 1, then the HEVC VUI second extension syntax 502 can include the subunit ticks 358, such as the num_units_in_sub_tick element.

The HEVC VUI second extension syntax 502 can include information about the bitstream, the VUI extension, and the RBSP information outside of the loop structure. The bitstream, VUI extension, and RBSP information is constant for all of the temporal layers.

The HEVC VUI second extension syntax 502 can include the VUI extension flag 408, such as the vui_extension_flag element, for indicating that VUI extension information is included in the video bitstream 110. The VUI extension flag 408 can have a value of 1 to indicate that VUI extension information is included in the video bitstream 110 and a value of 0 to indicate otherwise.

The HEVC VUI second extension syntax 502 can include the more RBSP data flag 410, such as the more_rbsp_data element, for indicating that additional data is in the RBSP. The more RBSP data flag 410 can have a value of 1 when additional data is in the RBSP and a value of 0 otherwise.

The HEVC VUI second extension syntax 502 can include the VUI extension data flag 412, such as the VUI_extension_data_flag element, for indicating that VUI extension data is included in the video bitstream 110. The VUI extension data flag 412 can have a value of 1 when the VUI extension data is included in the video bitstream 110 and a value of 0 otherwise.

The HEVC VUI second extension syntax 502 can include the RBSP trailing bits 414, such as a rbsp_trailing_bits element, is a data structure for flagging RBSP data. The RBSP trailing bits 414 can include the RBSP data, such as the rbsp_stop_one_bit element.

It has been discovered that encoding and decoding the video content 108 of FIG. 1 using the HEVC VUI second extension syntax 502 to support temporal scaling reduces the size of the video bitstream 110 and reduce the need for video buffering. Reducing the size of the video bitstream 110 increases functionality and increases the performance of display of the video stream 112 of FIG. 1.

It has been discovered that encoding and decoding the video content 108 using the HEVC VUI second extension syntax 502 to support temporal scaling separately for each occurrence of the temporal layers 230 reduces the size of the video bitstream 110 and reduce the need for video buffering. Reducing the size of the video bitstream 110 increases functionality and increases the performance of display of the video stream 112 of FIG. 1. Referring now to FIG. 6, therein is shown an example of a HRD syntax 602. The HRD syntax 602 describes the parameters associated with the hypothetical reference decoder.

The HRD syntax 602 includes elements as described in the HRD syntax table of FIG. 6. The elements of the HRD syntax 602 are arranged in a hierarchical structure as described in the HRD syntax table of FIG. 6.

The HRD syntax 602 can include a HRD syntax header 604, such as the hrd_parameters element. The HRD syntax header 604 is a descriptor for identifying the HRD syntax 602.

The HRD syntax 602 can include the HRD parameters structure 350 of FIG. 3 that includes the timing present information, the NAL HRD parameters, the VCL HRD parameters, and the fixed pic rate information. The timing present information can include the timing information present flag 338, the tick units 340, and the time scale 344.

The timing information present flag 338, such as the timing_info_present_flag element, can indicate whether timing information is included in the video bitstream 110 of FIG. 1. The timing information present flag 338 can have a value of 1 to indicate timing information is in the video bitstream 110 and a value of 0 to indicate that timing information is not included in the video bitstream 110.

The tick units 340, such as the num_units_in_tick element, can indicate the number of time units of a clock operating at the frequency of the time scale 344. For example, the tick units 340 can have corresponding to the minimum interval of time that can be represented in the video bitstream 110. The time scale 344, such as the time_scale element, is the number of time units that pass in one second.

The NAL HRD parameters present flag 348, such as the nal_hrd_parameters_present_flag element, can indicate the presence of the NAL HRD parameter information. The NAL HRD parameters present flag 348 can have a value of 1 to indicate that the HRD parameters structure 350 is present and a value of 0 to indicate the HRD parameters structure 350 is not present in the video bitstream 110.

The VCL HRD parameters present flag 352, such as the vcl_hrd_parameters_present_flag element, can indicate the presence of the HRD information for VCL. The VCL HRD parameters present flag 352 can have a value of 1 to indicate that the HRD parameters structure 350 is present and a value of 0 to indicate the HRD parameters structure 350 is not present in the video bitstream 110.

If the NAL HRD parameters present flag 348 or the VCL HRD parameters present flag 352 has a value of 1, then the HRD parameters structure 350 can include additional elements. For example, the HRD parameters structure 350 can include the sub-picture CPB parameters present flag 356, a bit rate scale 612, a CPB size scale 614, an initial CPB removal delay length 616, a CPB removal delay length 618, and a DPB output delay length 620.

The sub-picture CPB parameters present flag 356, such as the sub_pic_cpb_params_present_flag element, can indicate if sub-picture CPB parameters are present in the video bitstream 110. If the sub-picture CPB parameters present flag 356 has a value of 1, then the HRD parameters structure 350 can include a tick divisor 610, such as a tick_divisor_minus2 element, to specify the minimum interval of time that can be represented in the video bitstream 110.

The HRD parameters structure 350 can include the bit rate scale 612, such as a bit_rate_scale element. The bit rate scale 612 specifies the maximum input bit rate of coded picture buffer.

The HRD parameters structure 350 can include the CPB size scale 614, such as a cpb_size_scale element. The CPB size scale 614 is for determining the size of the CPB.

The HRD parameters structure 350 can include the initial CPB removal delay length 616, such as initial_cpb_removal_delay_length_minus1 element. The initial CPB removal delay length 616 indicates the bit length of the elements initial_cpb_removal_delay and initial_cpb_removal_delay_offset of the buffering period SEI message.

The HRD parameters structure 350 can include the CPB removal delay length 618, such as a cpb_removal_delay_length_minus1 element. The CPB removal delay length 618 can specify the bit length of the elements cpb_removal_delay in the picture timing SEI message.

The HRD parameters structure 350 can include a DPB output delay length 620, such as a dpb_output_delay_length_minus1 element. The DPB output delay length 620 indicates the size of the decoded picture buffer (DPB).

The HRD parameters structure 350 can include a set of parameters for each occurrence of the temporal layers 230 of FIG. 2. The HRD parameters structure 350 can include a loop structure using an iterator, such as [i], to describe parameters for each occurrence of the temporal layers 230.

The HRD parameters structure 350 can include a sub-layer count 630, such as the MaxNumSubLayersMinus1 element. The sub-layer count 630 indicates the maximum number of the sub-layers in the video bitstream 110. The HRD parameters structure 350 can include a common information present flag 603, such as the commonInfPresentFlag element, which can indicate if common HRD information is present.

The HRD parameters structure 350 can include the fixed picture rate flag 346, such as a fixed_pic_rate_flag element, to indicate whether the temporal distance between the HRD output times of any two consecutive pictures in the video bitstream 110 is constrained. If the fixed picture rate flag 346 has a value of 1, then the temporal distance between any two consecutive pictures is constrained and a value of 0 if not constrained.

If the fixed picture rate flag 346 has a value of 1, then the HRD parameters structure 350 can include a picture duration 622, such as a pic_duration_in_tc_minus1 element. The picture duration 622 can indicate the temporal distance between the HRD output times of any two consecutive pictures in output order in the coded video sequence.

The HRD parameters structure 350 can include the low delay HRD flag 354, such as a low_delay_hrd_flag element. The low delay HRD flag 354 can indicate the HRD operational mode.

The HRD parameters structure 350 can include a CPB count 626, such as a cpb_cnt_minus1 element. The CPB count 626 can indicate the number of alternative CPB specification in the video bitstream 110.

If the NAL HRD parameters present flag 348 or the VCL HRD parameters present flag 352 have a value of 1, then the HRD parameters structure 350 can include a HRD parameters sub-layer 628, such as a hrd_parameters_sub_layer element, for each occurrence of the temporal layers 230. The HRD parameters sub-layer 628 can describe the parameters related to each sub-layer.

It has been discovered that encoding and decoding the video content 108 of FIG. 1 using the HRD syntax 602 can reduce the size of the video bitstream 110 and reduces the amount of video buffering required to display the video stream 112 of FIG. 1. Reducing the size of the video bitstream 110 increases functionality and increases the performance of display of the video stream 112.

Referring now to FIG. 7, therein is shown an example of a HRD sub-layer syntax 702. The HRD sub-layer syntax 702 describes the parameters associated with the hypothetical reference decoder sub-layers.

The HRD sub-layer syntax 702 includes elements as described in the HRD sub-layer syntax table of FIG. 7. The elements of the HRD sub-layer syntax 702 are arranged in a hierarchical structure as described in the HRD sub-layer syntax table of FIG. 7.

The HRD sub-layer syntax 702 can include a HRD sub-layer syntax header 704, such as a hrd_parameters_sub_layer element. The HRD sub-layer syntax header 704 is a descriptor for identifying the HRD sub-layer syntax 702.

The HRD sub-layer syntax 702 can include a loop structure to define a set of parameters for each occurrence of the coded picture buffer. The loop structure is dimensioned based on a schedule selection index, such as a SchedSelIdx element.

The HRD sub-layer syntax 702 can describe properties of the temporal layers 230 of FIG. 2. The temporal layers 230 can also be designated as sub-layers of the video bitstream 110 of FIG. 1.

The HRD sub-layer syntax 702 can include a bit rate value 706, such as a bit_rate_value_minus1 element. The bit rate value 706 can be used to specify the maximum input bit rate for each occurrence of the coded picture buffer.

The HRD sub-layer syntax 702 can include a CPB size value 708, such as a CPB size value mmus1 element. The CPB size value 708 can be used to determine the size of each occurrence of the coded picture buffer.

The HRD sub-layer syntax 702 can include a CBR flag 710, such as a cbr_flag element. The CBR flag 710 indicates the operation mode for decoding the video bitstream 110 for each occurrence of the coded picture buffer. If the CBR flag 710 has a value of 1, then the hypothetical stream delivery schedule (HSS) operates in a constant bit rate mode. Otherwise, the video bitstream 110 operates in an intermittent bit rate mode.

The HRD sub-layer syntax 702 can represent the sub-layers or the temporal layers 230 of the video bitstream 110. The HRD sub-layer syntax 702 can be used to select one of the sub-layers or one of the temporal layers 230 and allow the removal occurrences of other sub-layers from the video bitstream 110.

Removing occurrences of the sub-layers or the temporal layers 230 can reduce the overall volume of data within the video bitstream 110 and enable bit-rate reduction or resizing of the video content 108 of FIG. 1 for better transmission, improved storage bandwidth control and adjustment. Providing sub-layer or temporal layer specific HRD parameters enable better and smoother bitstream decoding to generate the video stream 112 of FIG. 1.

It has been discovered that using the HRD sub-layer syntax 702 provides improved performance by enabling finer grained control over the processing of the individual sub-layers. Using individual occurrences of the HRD sub-layer syntax 702 can provide improved processing speed by taking advantage of individual differences between different sub-layers.

Referring now to FIG. 8, therein is shown an example of a HRD VUI syntax 802. The HRD VUI syntax 802 describes the parameters associated with the hypothetical reference decoder.

The HRD VUI syntax 802 includes elements as described in the HRD VUI syntax table of FIG. 8. The elements of the HRD VUI syntax 802 are arranged in a hierarchical structure as described in the HRD VUI syntax table of FIG. 8. For example, the HRD VUI syntax 802 can be an extension of the HEVC VUI syntax 302 of FIG. 3.

The HRD VUI syntax 802 can include a HRD VUI syntax header 804, such as the vui_parameters element. The HRD VUI syntax header 804 is a descriptor for identifying the HRD VUI syntax 802.

The HRD VUI syntax 802 can include the HRD parameters structure 350, such as the hrd_parameters element. The HRD parameters structure 350 includes the hypothetical reference decoder parameters for each sub-layer or each of the temporal layers 230 of FIG. 2.

The HRD VUI syntax 802 replaces the fixed HRD-related parameters including the timing present information, the NAL HRD parameters, the VCL HRD parameters, and the fixed pic rate information with the HRD parameters structure 350. The HRD parameters structure 350 provides a set of HRD parameters for each of the sub-layers or each of the temporal layers 230.

The HRD VUI syntax 802 can include the sub-layer count 630 of FIG. 6, which can be assigned a value from the sps_max_sub_layers_minus1 element.

The sps_max_sub_layers_minus1 element can be defined in a sequence parameter set (SPS) syntax. The HRD VUI syntax 802 can include the common information present flag 603 to indicate the presence of common HRD information.

The sub-layers can represent the temporal layers 230 or other types of video layers in the video bitstream 110 of FIG. 1. The total number of the temporal layers 230 can be represented by the sub-layer count 630.

The field sequence flag 336 in the HRD VUI syntax 802 can support interlaced picturing coding. Providing the video format 317 in the HRD VUI syntax 802 can provide enhanced functionality by simplifying the determination of the video system used by the video content 108.

The video full range flag 318 can indicate the black level and range of the luma and chroma signals. The color description present flag 320 can indicate the presence of color description information in the video bitstream 110, such as the color primaries 322, the transfer characteristics 324, and the matrix coefficient 326.

The HRD VUI syntax 802 can include metadata for enhancing the decoding of the video bitstream 110. The bitstream restriction flag 360, the tiles fixed structure flag 362, the motion vector flag 364, the max bytes per picture denomination 366, the maximum bits per minimum cu denomination 368, the maximum motion vector horizontal length 370, and the maximum motion vector vertical length 372 can be used to control the decoding of the video bitstream 110.

It has been discovered that using the HRD parameters structure 350 in the HRD VUI syntax 802 provides improved performance by enabling finer grained control over the processing of the individual sub-layers instead of using common HRD parameters for all sub-layers. Using individual occurrences of the HRD parameters structure 350 can provide improved processing speed by taking advantage of individual differences between different sub-layers.

Figure 9:
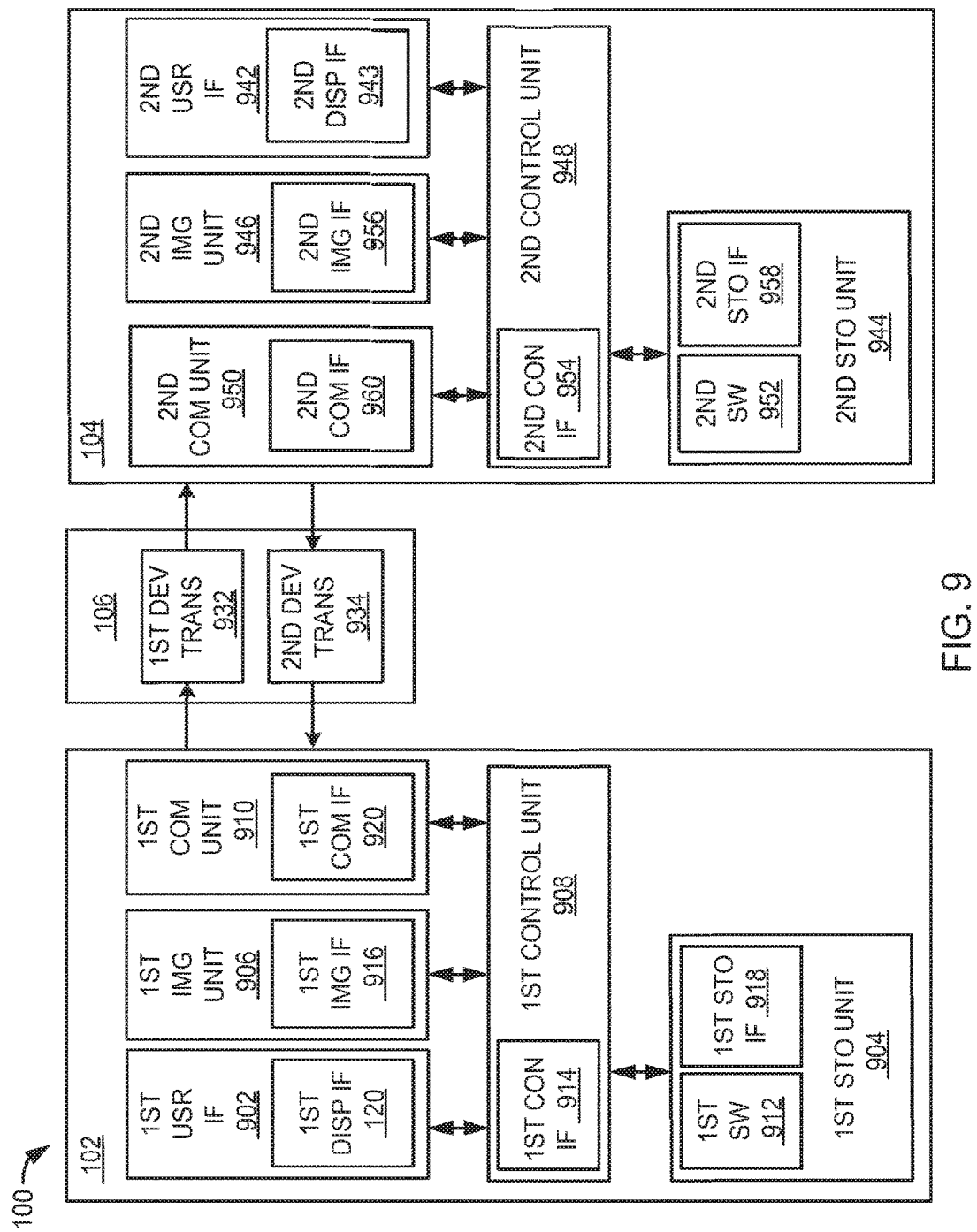
FIG. 9 is a functional block diagram of the video coding system.

Referring now to FIG. 9, therein is shown a functional block diagram of the video coding system 100. The video coding system 100 can include the first device 102, the second device 104 and the communication path 106.

The first device 102 can communicate with the second device 104 over the communication path 106. The first device 102 can send information in a first device transmission 932 over the communication path 106 to the second device 104. The second device 104 can send information in a second device transmission 934 over the communication path 106 to the first device 102.

For illustrative purposes, the video coding system 100 is shown with the first device 102 as a client device, although it is understood that the video coding system 100 can have the first device 102 as a different type of device. For example, the first device can be a server. In a further example, the first device 102 can be the video encoder 102, the video decoder 104, or a combination thereof.

Also for illustrative purposes, the video coding system 100 is shown with the second device 104 as a server, although it is understood that the video coding system 100 can have the second device 104 as a different type of device. For example, the second device 104 can be a client device. In a further example, the second device 104 can be the video encoder 102, the video decoder 104, or a combination thereof.

For brevity of description in this embodiment of the present invention, the first device 102 will be described as a client device, such as a video camera, smart phone, or a combination thereof. The present invention is not limited to this selection for the type of devices. The selection is an example of the present invention.

The first device 102 can include a first control unit 908. The first control unit 908 can include a first control interface 914. The first control unit 908 can execute a first software 912 to provide the intelligence of the video coding system 100.

The first control unit 908 can be implemented in a number of different manners. For example, the first control unit 908 can be a processor, an embedded processor, a microprocessor, a hardware control logic, a hardware finite state machine (FSM), a digital signal processor (DSP), or a combination thereof.

The first control interface 914 can be used for communication between the first control unit 908 and other functional units in the first device 102. The first control interface 914 can also be used for communication that is external to the first device 102.

The first control interface 914 can receive information from the other functional units or from external sources, or can transmit information to the other functional units or to external destinations. The external sources and the external destinations refer to sources and destinations external to the first device 102.

The first control interface 914 can be implemented in different ways and can include different implementations depending on which functional units or external units are being interfaced with the first control interface 914. For example, the first control interface 914 can be implemented with electrical circuitry, microelectromechanical systems (MEMS), optical circuitry, wireless circuitry, wireline circuitry, or a combination thereof.

The first device 102 can include a first storage unit 904. The first storage unit 904 can store the first software 912. The first storage unit 904 can also store the relevant information, such as images, syntax information, video, maps, profiles, display preferences, sensor data, or any combination thereof.

The first storage unit 904 can be a volatile memory, a nonvolatile memory, an internal memory, an external memory, or a combination thereof. For example, the first storage unit 904 can be a nonvolatile storage such as non-volatile random access memory (NVRAM), Flash memory, disk storage, or a volatile storage such as static random access memory (SRAM).

The first storage unit 904 can include a first storage interface 918. The first storage interface 918 can be used for communication between the first storage unit 904 and other functional units in the first device 102. The first storage interface 918 can also be used for communication that is external to the first device 102.

The first device 102 can include a first imaging unit 906. The first imaging unit 906 can capture the video content 108 of FIG. 1 from the real world. The first imaging unit 906 can include a digital camera, an video camera, an optical sensor, or any combination thereof.

The first imaging unit 906 can include a first imaging interface 916.

The first imaging interface 916 can be used for communication between the first imaging unit 906 and other functional units in the first device 102.

The first imaging interface 916 can receive information from the other functional units or from external sources, or can transmit information to the other functional units or to external destinations. The external sources and the external destinations refer to sources and destinations external to the first device 102.

The first imaging interface 916 can include different implementations depending on which functional units or external units are being interfaced with the first imaging unit 906. The first imaging interface 916 can be implemented with technologies and techniques similar to the implementation of the first control interface 914.

The first storage interface 918 can receive information from the other functional units or from external sources, or can transmit information to the other functional units or to external destinations. The external sources and the external destinations refer to sources and destinations external to the first device 102.

The first storage interface 918 can include different implementations depending on which functional units or external units are being interfaced with the first storage unit 904.

The first storage interface 918 can be implemented with technologies and techniques similar to the implementation of the first control interface 914.

The first device 102 can include a first communication unit 910. The first communication unit 910 can be for enabling external communication to and from the first device 102. For example, the first communication unit 910 can permit the first device 102 to communicate with the second device 104, an attachment, such as a peripheral device or a computer desktop, and the communication path 106.

The first communication unit 910 can also function as a communication hub allowing the first device 102 to function as part of the communication path 106 and not limited to be an end point or terminal unit to the communication path 106. The first communication unit 910 can include active and passive components, such as microelectronics or an antenna, for interaction with the communication path 106.

The first communication unit 910 can include a first communication interface 920. The first communication interface 920 can be used for communication between the first communication unit 910 and other functional units in the first device 102. The first communication interface 920 can receive information from the other functional units or can transmit information to the other functional units.

The first communication interface 920 can include different implementations depending on which functional units are being interfaced with the first communication unit 910. The first communication interface 920 can be implemented with technologies and techniques similar to the implementation of the first control interface 914.

The first device 102 can include a first user interface 902. The first user interface 902 allows a user (not shown) to interface and interact with the first device 102. The first user interface 902 can include a first user input (not shown). The first user input can include touch screen, gestures, motion detection, buttons, sliders, knobs, virtual buttons, voice recognition controls, or any combination thereof.

The first user interface 902 can include the first display interface 120. The first display interface 120 can allow the user to interact with the first user interface 902. The first display interface 120 can include a display, a video screen, a speaker, or any combination thereof.

The first control unit 908 can operate with the first user interface 902 to display video information generated by the video coding system 100 on the first display interface 120. The first control unit 908 can also execute the first software 912 for the other functions of the video coding system 100, including receiving video information from the first storage unit 904 for display on the first display interface 120. The first control unit 908 can further execute the first software 912 for interaction with the communication path 106 via the first communication unit 910.

For illustrative purposes, the first device 102 can be partitioned having the first user interface 902, the first storage unit 904, the first control unit 908, and the first communication unit 910, although it is understood that the first device 102 can have a different partition. For example, the first software 912 can be partitioned differently such that some or all of its function can be in the first control unit 908 and the first communication unit 910. Also, the first device 102 can include other functional units not shown in FIG. 10 for clarity.

The video coding system 100 can include the second device 104. The second device 104 can be optimized for implementing the present invention in a multiple device embodiment with the first device 102. The second device 104 can provide the additional or higher performance processing power compared to the first device 102.

The second device 104 can include a second control unit 948. The second control unit 948 can include a second control interface 954. The second control unit 948 can execute a second software 952 to provide the intelligence of the video coding system 100.

The second control unit 948 can be implemented in a number of different manners. For example, the second control unit 948 can be a processor, an embedded processor, a microprocessor, a hardware control logic, a hardware finite state machine, a digital signal processor, or a combination thereof.

The second control interface 954 can be used for communication between the second control unit 948 and other functional units in the second device 104. The second control interface 954 can also be used for communication that is external to the second device 104. The second control interface 954 can receive information from the other functional units or from external sources, or can transmit information to the other functional units or to external destinations. The external sources and the external destinations refer to sources and destinations external to the second device 104.

The second control interface 954 can be implemented in different ways and can include different implementations depending on which functional units or external units are being interfaced with the second control interface 954. For example, the second control interface 954 can be implemented with electrical circuitry, microelectromechanical systems (MEMS), optical circuitry, wireless circuitry, wireline circuitry, or a combination thereof.

The second device 104 can include a second storage unit 944. The second storage unit 944 can store the second software 952. The second storage unit 944 can also store the relevant information, such as images, syntax information, video, maps, profiles, display preferences, sensor data, or any combination thereof.

The second storage unit 944 can be a volatile memory, a nonvolatile memory, an internal memory, an external memory, or a combination thereof. For example, the second storage unit 944 can be a nonvolatile storage such as non-volatile random access memory (NVRAM), Flash memory, disk storage, or a volatile storage such as static random access memory (SRAM).

The second storage unit 944 can include a second storage interface 958. The second storage interface 958 can be used for communication between the second storage unit 944 and other functional units in the second device 104. The second storage interface 958 can also be used for communication that is external to the second device 104.

The second storage interface 958 can receive information from the other functional units or from external sources, or can transmit information to the other functional units or to external destinations. The external sources and the external destinations refer to sources and destinations external to the second device 104.

The second storage interface 958 can include different implementations depending on which functional units or external units are being interfaced with the second storage unit 944. The second storage interface 958 can be implemented with technologies and techniques similar to the implementation of the second control interface 954.

The second device 104 can include a second imaging unit 946. The second imaging unit 946 can capture the video content 108 from the real world. The first imaging unit 906 can include a digital camera, an video camera, an optical sensor, or any combination thereof. The second imaging unit 946 can include a second imaging interface 956. The second imaging interface 956 can be used for communication between the second imaging unit 946 and other functional units in the second device 104.

The second imaging interface 956 can receive information from the other functional units or from external sources, or can transmit information to the other functional units or to external destinations. The external sources and the external destinations refer to sources and destinations external to the second device 104.

The second imaging interface 956 can include different implementations depending on which functional units or external units are being interfaced with the second imaging unit 946. The second imaging interface 956 can be implemented with technologies and techniques similar to the implementation of the first control interface 914.

The second device 104 can include a second communication unit 950. The second communication unit 950 can enable external communication to and from the second device 104. For example, the second communication unit 950 can permit the second device 104 to communicate with the first device 102, an attachment, such as a peripheral device or a computer desktop, and the communication path 106.

The second communication unit 950 can also function as a communication hub allowing the second device 104 to function as part of the communication path 106 and not limited to be an end point or terminal unit to the communication path 106. The second communication unit 950 can include active and passive components, such as microelectronics or an antenna, for interaction with the communication path 106.

The second communication unit 950 can include a second communication interface 960. The second communication interface 960 can be used for communication between the second communication unit 950 and other functional units in the second device 104. The second communication interface 960 can receive information from the other functional units or can transmit information to the other functional units.

The second communication interface 960 can include different implementations depending on which functional units are being interfaced with the second communication unit 950. The second communication interface 960 can be implemented with technologies and techniques similar to the implementation of the second control interface 954.

The second device 104 can include a second user interface 942. The second user interface 942 allows a user (not shown) to interface and interact with the second device 104. The second user interface 942 can include a second user input (not shown). The second user input can include touch screen, gestures, motion detection, buttons, sliders, knobs, virtual buttons, voice recognition controls, or any combination thereof.

The second user interface 942 can include a second display interface 943. The second display interface 943 can allow the user to interact with the second user interface 942. The second display interface 943 can include a display, a video screen, a speaker, or any combination thereof.

The second control unit 948 can operate with the second user interface 942 to display information generated by the video coding system 100 on the second display interface 943. The second control unit 948 can also execute the second software 952 for the other functions of the video coding system 100, including receiving display information from the second storage unit 944 for display on the second display interface 943. The second control unit 948 can further execute the second software 952 for interaction with the communication path 106 via the second communication unit 950.

For illustrative purposes, the second device 104 can be partitioned having the second user interface 942, the second storage unit 944, the second control unit 948, and the second communication unit 950, although it is understood that the second device 104 can have a different partition. For example, the second software 952 can be partitioned differently such that some or all of its function can be in the second control unit 948 and the second communication unit 950. Also, the second device 104 can include other functional units not shown in FIG. 10 for clarity.

The first communication unit 910 can couple with the communication path 106 to send information to the second device 104 in the first device transmission 932. The second device 104 can receive information in the second communication unit 950 from the first device transmission 932 of the communication path 106.

The second communication unit 950 can couple with the communication path 106 to send video information to the first device 102 in the second device transmission 934. The first device 102 can receive video information in the first communication unit 910 from the second device transmission 934 of the communication path 106. The video coding system 100 can be executed by the first control unit 908, the second control unit 948, or a combination thereof.

The functional units in the first device 102 can work individually and independently of the other functional units. For illustrative purposes, the video coding system 100 is described by operation of the first device 102. It is understood that the first device 102 can operate any of the modules and functions of the video coding system 100. For example, the first device 102 can be described to operate the first control unit 908.

The functional units in the second device 104 can work individually and independently of the other functional units. For illustrative purposes, the video coding system 100 can be described by operation of the second device 104. It is understood that the second device 104 can operate any of the modules and functions of the video coding system 100. For example, the second device 104 is described to operate the second control unit 948.

For illustrative purposes, the video coding system 100 is described by operation of the first device 102 and the second device 104. It is understood that the first device 102 and the second device 104 can operate any of the modules and functions of the video coding system 100. For example, the first device 102 is described to operate the first control unit 908, although it is understood that the second device 104 can also operate the first control unit 908.

Figure 10:
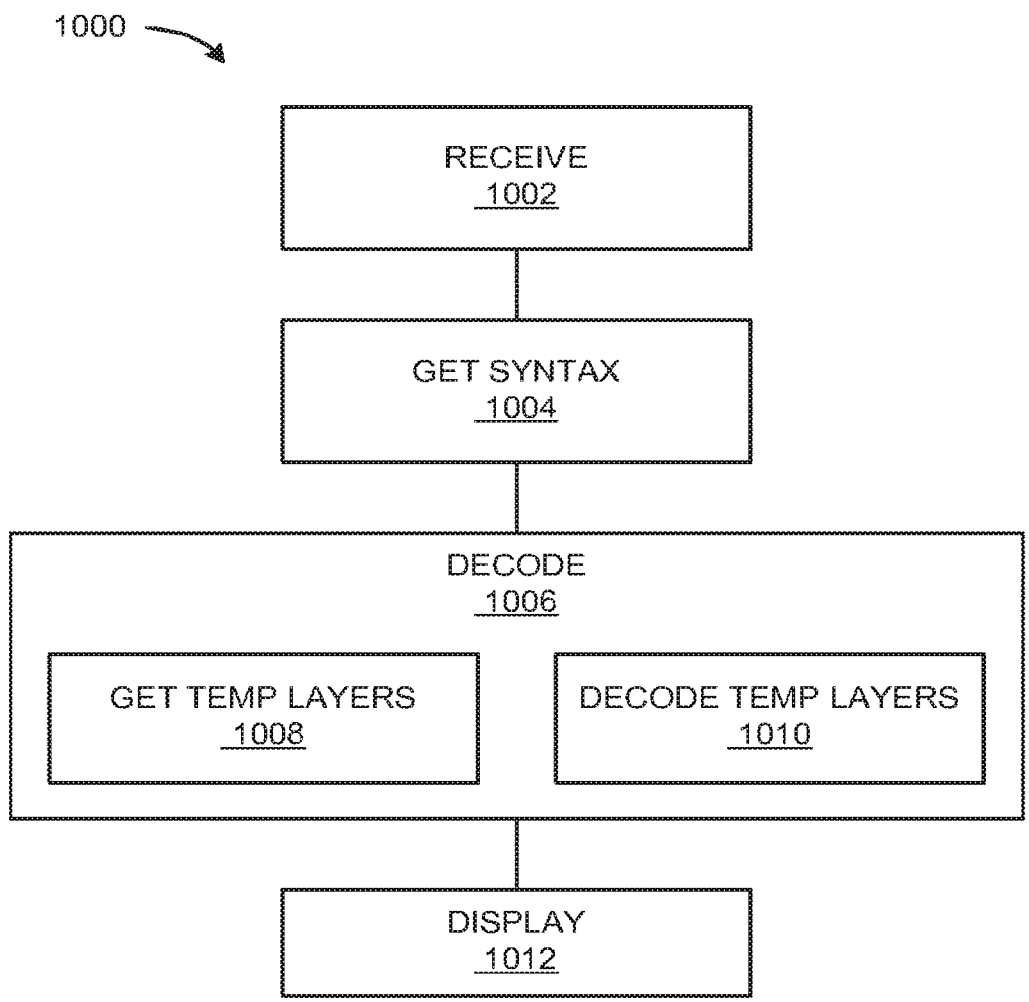
FIG. 10 is a control flow of the video coding system.

Referring now to FIG. 10, therein is shown a control flow 1000 of the video coding system 100 of FIG. 1. The control flow 1000 describes decoding the video bitstream 110 of FIG. 1 by receiving the video bitstream 110, extracting the video syntax 114 of FIG. 1, decoding the video bitstream 110, and displaying the video stream 112 of FIG. 1.

The video coding system 100 can include a receive module 1002. The receive module 1002 can receive the video bitstream 110 encoded by the video encoder 102 of FIG. 1.

The video bitstream 110 can be received in a variety of ways. For example, the video bitstream 110 can be received from the video encoder 102 of FIG. 1 as a streaming serial bitstream, a pre-encoded video file (not shown), in a digital message (not shown) over the communication path 106 of FIG. 1, or a combination thereof.

The video bitstream 110 can include one or more the temporal layers 230 of FIG. 2 for representing the video content 108 of FIG. 1 at different frame rates. The receive module 1002 can selectively filter the temporal layers 230 to reduce the size of the video bitstream 110.

For example, the receive module 1002 can receive the video bitstream 110 having the temporal layers 230 for three different frame rates, such as 60 fps, 30 fps, and 15 fps. The receive module 1002 can filter the video bitstream 110 to remove the 60 fps and the 30 fps occurrences of the temporal layers 230 and only process the 15 fps occurrence of the temporal layers 230.

The video coding system 100 can include a get syntax module 1004. The get syntax module 1004 can identify and extract the video syntax 114 of the video bitstream 110.

The get syntax module 1004 can extract the video syntax 114 for the video bitstream 110 in a variety of ways. The get syntax module 1004 can extract the video syntax 114 by searching the video bitstream 110 for video usability information headers indicating the presence of the video syntax 114. In another example, the video syntax 114 can be extracted from the video bitstream 110 using a demultiplexer (not shown) to separate the video syntax 114 from the video image data of the video bitstream 110.

In yet another example, the video syntax 114 can be extracted from the video bitstream 110 by extracting a sequence parameter set Raw Byte Sequence Payload (RBSP) syntax. The sequence parameter set RBSP is a syntax structure containing a integer number of bytes encapsulated in a network abstraction layer unit. The RBSP can be either empty or have the form of a string of data bits containing syntax elements followed by a RBSP stop bit and followed by zero or more addition bits equal to 0.

In yet another example, the video syntax 114 can be extracted from the serial bitstream of the video bitstream 110 in a timewise manner by extracting individual elements as the elements become available in the serial bitstream. The video coding system 100 can selectively extract later elements based on the values of the earlier extracted elements. The video coding system 100 can process the HRD parameters structure 350 of FIG. 3 based on the previously received value of the low delay HRD flag 354 of FIG. 3.

It has been discovered that the get syntax module 1004 can increase performance by dynamically decoding the video bitstream 110 using the HRD parameters structure 350 based on previously extracted occurrences of the low delay HRD flag 354. Receiving the low delay HRD flag 354 increases decoding performance by changing the level of delay allowed in the CPB when applying the HRD parameters structure 350.

In another example, if the video bitstream 110 is received in a file, then the video syntax 114 can be detected by examining the file extension of the file containing the video bitstream 110. In yet another example, if the video bitstream 110 is received as a digital message over the communication path 106 of FIG. 1, then the video syntax 114 can be provided as a portion of the structure of the digital message.

The get syntax module 1004 can extract the individual elements of the video syntax 114 based on the syntax type 202 of FIG. 2. The syntax type 202 can include AVC video, SVC video, MVC video, MVD video, SSV video, or a combination thereof.

For example, the get syntax module 1004 can extract the video syntax 114, such as the HEVC VUI syntax 302 of FIG. 3, the HEVC VUI first extension syntax 402 of FIG. 4, the HEVC VUI second extension syntax 502 of FIG. 5, or a combination thereof. The get syntax module 1004 can extract the video syntax 114 including the HRD syntax 602 of FIG. 6, the HRD sub-layer syntax 702 of FIG. 7, or a combination thereof.

The get syntax module 1004 can extract the video syntax 114 in a variety of ways. For example, the get syntax module 1004 can extract the video syntax 114, such as the HEVC VUI syntax 302, from the video bitstream 110. The HEVC VUI syntax 302 can include one occurrence of the HRD syntax 602 for all occurrences of the temporal layers 230. The HEVC VUI syntax 302 can include one occurrence of elements of the HEVC VUI syntax 302 for all occurrences of the temporal layers 230.

In another example, the get syntax module 1004 can extract the video syntax 114, such as the HEVC VUI first extension syntax 402, from the video bitstream 110. The HEVC VUI first extension syntax 402 can include an occurrence of the HRD syntax 602 for each individual occurrence of the temporal layers 230.

The HEVC VUI first extension syntax 402 can include individual occurrences of the field sequence flag 336 of FIG. 3, the timing information present flag 338 of FIG. 3, the tick units 340 of FIG. 3, the time scale 344 of FIG. 3, and the fixed picture rate flag 346 of FIG. 3 for each individual occurrence of the temporal layers 230. The HEVC VUI first extension syntax 402 can include the NAL HRD parameters present flag 348 of FIG. 3, the VCL HRD parameters present flag 352 of FIG. 3, the low delay HRD flag 354 of FIG. 3, the sub-picture CPB parameters present flag 356 of FIG. 3, and the subunit ticks 358 of FIG. 3 for each individual occurrence of the temporal layers 230.

In yet another example, the get syntax module 1004 can extract the video syntax 114, such as the HEVC VUI second extension syntax 502, from the video bitstream 110. The HEVC VUI second extension syntax 502 can one occurrence of the field sequence flag 336, the timing information present flag 338, the tick units 340, the time scale 344, and the fixed picture rate flag 346 for all occurrences of the temporal layers 230. The HEVC VUI second extension syntax 502 can include the NAL HRD parameters present flag 348, the VCL HRD parameters present flag 352, the low delay HRD flag 354, the sub-picture CPB parameters present flag 356, and the subunit ticks 358 for each individual occurrence of the temporal layers 230.

The video coding system 100 can include a decode module 1006. The decode module 1006 can decode the video bitstream 110 using the video syntax 114 to form the video stream 112. The decode module 1006 can include a get temporal layers module 1008 and a decode temporal layers module 1010.

The decode module 1006 can decode the video bitstream 110 using the HEVC VUI syntax 302, the HEVC VUI first extension syntax 402, the HEVC VUI second extension syntax 502, or a combination thereof. The decode module 1006 can identify extract the temporal layers 230 using the HRD syntax 602, the HRD sub-layer syntax 702, the HRD VUI syntax 802 of FIG. 8, or a combination thereof.

The get temporal layers module 1008 can identify the temporal layers 230 to extract from the video bitstream 110 to form the video stream 112. The get temporal layers module 1008 can identify the temporal layers 230 in a variety of ways.

For example, the get temporal layers module 1008 can identify the temporal layers 230 by extracting the temporal layer count 406 of FIG. 4 from the HEVC VUI first extension syntax 402 or the HEVC VUI second extension syntax 502. The temporal layer count 406 indicates the total number of temporal layers 230 in the video bitstream 110. In another example, the get temporal layers module 1008 can identify the temporal layers by extracting a single occurrence of the HRD syntax 602 from the HEVC VUI syntax 302 to apply to all of the temporal layers 230 in the video bitstream 110.

The decode temporal layers module 1010 can receive the temporal layers 230 from the get temporal layers module 1008 and decode the temporal layers 230 to form the video stream 112. The decode temporal layers module 1010 can decode the temporal layers 230 in a variety of ways.

For example, the decode temporal layers module 1010 can decode the temporal layers 230 using the HRD syntax 602. In another example, the decode temporal layers module 1010 can decode the temporal layers 230 using the HRD sub-layer syntax 702. The decode temporal layers module 1010 can decode the temporal layers 230 and select one of the temporal layers 230 to form the video stream 112.

The parameters of the HRD syntax 602 can be used to manage the smooth decoding of the video bitstream 110 including controlling the rates of data buffering in the coded picture buffers. The timing information present flag 338, sub-picture CPB parameters present flag 356, the bit rate scale 612, the CPB size scale 614, the CPB removal delay length 618, and the DPB output delay length 620 can be used to regulate the flow of data into the coded picture buffers and the decoded picture buffers.

The video coding system 100 can include a display module 1012. The display module 1012 can receive the video stream 112 from the decode module 1006 and display on the display interface 120 of FIG. 1. The video stream 112 can include one or more occurrences of the temporal layers 230.

The physical transformation from the optical images of physical objects of the video content 108 to displaying the video stream 112 on the pixel elements of the display interface 120 of FIG. 9 results in physical changes to the pixel elements of the display interface 120 in the physical world, such as the change of electrical state the pixel element, is based on the operation of the video coding system 100. As the changes in the physical world occurs, such as the motion of the objects captured in the video content 108, the movement itself creates additional information, such as the updates to the video content 108, that are converted back into changes in the pixel elements of the display interface 120 for continued operation of the video coding system 100.

The first software 912 of FIG. 9 of the first device 102 can include the video coding system 100. For example, the first software 912 can include the receive module 1002, the get syntax module 1004, the decode module 1006, and the display module 1012.

The first control unit 908 of FIG. 9 can execute the first software 912 for the receive module 1002 to receive the video bitstream 110. The first control unit 908 can execute the first software 912 for the get syntax module 1004 to identify and extract the video syntax 114 from the video bitstream 110. The first control unit 908 can execute the first software 912 for the decode module 1006 to form the video stream 112. The first control unit 908 can execute the first software 912 for the display module 1012 to display the video stream 112.

The second software 952 of FIG. 9 of the second device 104 of FIG. 1 can include the video coding system 100. For example, the second software 952 can include the receive module 1002, the get syntax module 1004, and the decode module 1006.

The second control unit 948 of FIG. 9 can execute the second software 952 for the receive module 1002 to receive the video bitstream 110. The second control unit 948 can execute the second software 952 for the get syntax module 1004 to identify and extract the video syntax 114 from the video bitstream 110. The second control unit 948 can execute the second software 952 for the decode module 1006 to form the video stream 112 of FIG. 1. The second control unit 948 can execute the second software for the display module 1012 to display the video stream 112.

The video coding system 100 can be partitioned between the first software 912 and the second software 952. For example, the second software 952 can include the get syntax module 1004, the decode module 1006, and the display module 1012. The second control unit 948 can execute modules partitioned on the second software 952 as previously described. In an illustrative example, the video coding system 100 can include the video encoder 102 on the first device 102 and the video decoder 104 on the second device 104. The video decoder 104 can include the display processor 118 of FIG. 1 and the display interface 120.

The first software 912 can include the receive module 1002 and the get syntax module 1004. Depending on the size of the first storage unit 904 of FIG. 9, the first software 912 can include additional modules of the video coding system 100. The first control unit 908 can execute the modules partitioned on the first software 912 as previously described.

The first control unit 908 can operate the first communication unit 910 of FIG. 9 to send the video bitstream 110 to the second device 104. The first control unit 908 can operate the first software 912 to operate the first imaging unit 906 of FIG. 9. The second communication unit 950 of FIG. 9 can send the video stream 112 to the first device 102 over the communication path 106.

The video coding system 100 describes the module functions or order as an example. The modules can be partitioned differently. For example, the get syntax module 1004 and the decode module 1006 can be combined. Each of the modules can operate individually and independently of the other modules.

Furthermore, data generated in one module can be used by another module without being directly coupled to each other. For example, the get syntax module 1004 can receive the video bitstream 110 from the receive module 1002.

The modules can be implemented in a variety of ways. The receive module 1002, the get syntax module 1004, the decode module 1006, and the display module 1012 can be implemented in as hardware accelerators (not shown) within the first control unit 908 or the second control unit 948, or can be implemented in as hardware accelerators (not shown) in the first device 102 or the second device 104 outside of the first control unit 908 or the second control unit 948.

Figure 11:
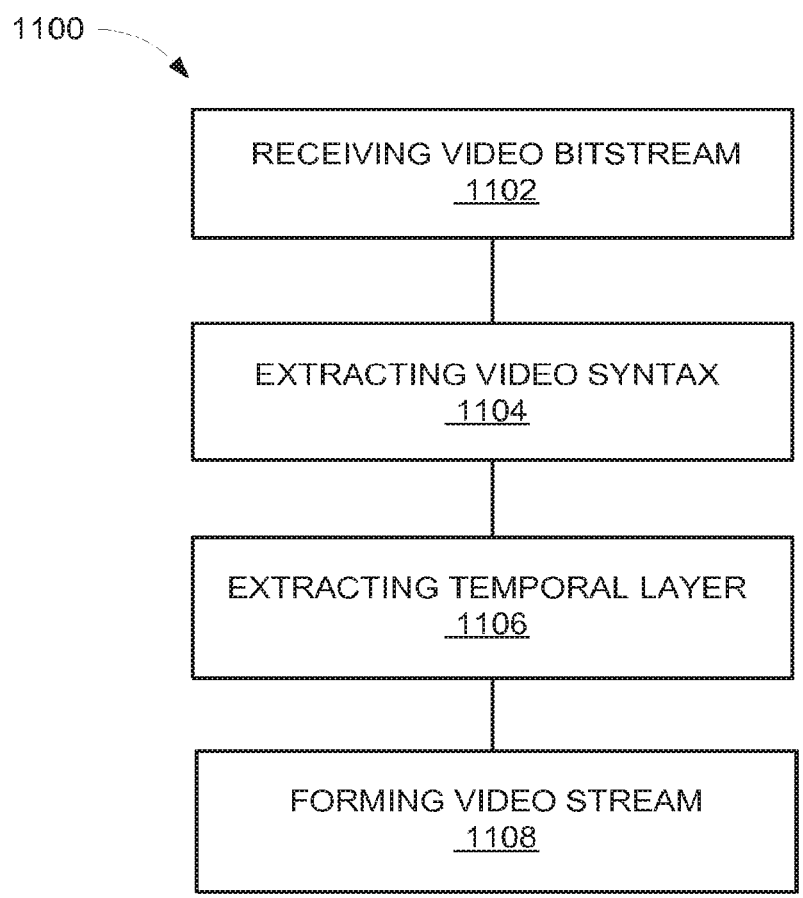
FIG. 11 is a flow chart of a method of operation of the video coding system in a further embodiment of the present invention.

Referring now to FIG. 11, therein is shown a flow chart of a method 1100 of operation of the video coding system 100 of FIG. 1 in a further embodiment of the present invention. The method 1100 includes: receiving a video bitstream in a block 1102; extracting a video syntax from the video bitstream in a block 1104; extracting a temporal layer from the video bitstream based on the video syntax in a block 1106; and forming a video stream based on the temporal layer for displaying on a device in a block 1108.

It has been discovered that the present invention thus has numerous aspects. The present invention valuably supports and services the historical trend of reducing costs, simplifying systems, and increasing performance. These and other valuable aspects of the present invention consequently further the state of the technology to at least the next level.

Thus, it has been discovered that the video coding system of the present invention furnishes important and heretofore unknown and unavailable solutions, capabilities, and functional aspects for efficiently coding and decoding video content for high definition applications. The resulting processes and configurations are straightforward, cost-effective, uncomplicated, highly versatile and effective, can be surprisingly and unobviously implemented by adapting known technologies, and are thus readily suited for efficiently and economically manufacturing video coding devices fully compatible with conventional manufacturing processes and technologies. The resulting processes and configurations are straightforward, cost-effective, uncomplicated, highly versatile, accurate, sensitive, and effective, and can be implemented by adapting known components for ready, efficient, and economical manufacturing, application, and utilization.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. An encoding apparatus, comprising:
a setting unit configured to set video usability information (VUI) parameter including a field_seq_flag,
wherein the field_seq_flag indicates whether a video stream includes a video representing field, and
wherein the field_seq_flag has a value that is constant across all occurrences of a temporal layer; and
an encoder connected to the setting unit, wherein the encoder is configured to:
encode the video stream based on the temporal layer; and
generate, based on the encoded video stream, an encoding bitstream that includes the VUI parameter set by the setting unit.

2. The encoding apparatus of claim 1, wherein the setting unit is further configured to set the VUI parameter as syntax common to all the occurrences of the temporal layer.

3. The encoding apparatus of claim 1, wherein the VUI parameter further includes a timing_info_present_flag.

4. The encoding apparatus of claim 3, wherein each VUI parameter related to the timing_info_present_flag is common to all the occurrences of the temporal layer.

5. The encoding apparatus of claim 1, wherein the setting unit is further configured to set a hypothetical reference decoder (HRD) parameter common to all the occurrences of the temporal layer.

6. The encoding apparatus of claim 1, wherein the setting unit is further configured to set a different hypothetical reference decoder (HRD) parameter for each occurrence of the temporal layer.

7. An encoding method, comprising:
setting video usability information (VUI) parameter including a field_seq_flag,
wherein the field_seq_flag indicates whether a video stream includes a video representing field, and
wherein the field_seq_flag has a value that is constant across all occurrences of a temporal layer;
encoding the video stream based on the temporal layer; and
generating, based on the encoded video stream, an encoding bitstream that includes the set VUI parameter.

8. The encoding method of claim 7, wherein the VUI parameter is set as syntax common to all the occurrences of the temporal layer.

9. The encoding method of claim 7, wherein the VUI parameter further includes a timing_info_present_flag.

10. The encoding method of claim 9, wherein each VUI parameter related to the timing_info_present_flag is common to all the occurrences of the temporal layer.

11. The encoding method of claim 7, further comprising:
setting a hypothetical reference decoder (HRD) parameter common to all the occurrences of the temporal layer.

12. The encoding method of claim 7, further comprising:
setting a hypothetical reference decoder (HRD) parameter for each occurrence of the temporal layer.

* * * * *